United States Patent
Leithead et al.

(10) Patent No.: US 8,881,101 B2
(45) Date of Patent: *Nov. 4, 2014

(54) BINDING BETWEEN A LAYOUT ENGINE AND A SCRIPTING ENGINE

(75) Inventors: Travis Leithead, Bellevue, WA (US); Justin Rogers, Redmond, WA (US); Miladin Pavlicic, Sammamish, WA (US); Curtis Cheng-Cheng Man, Seattle, WA (US); Yong Qu, Sammamish, WA (US); Nathan J. E. Furtwangler, Seattle, WA (US); Reza A. Nourai, Kirkland, WA (US); Steven Lucco, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 323 days.

This patent is subject to a terminal disclaimer.

(21) Appl. No.: 13/114,924

(22) Filed: May 24, 2011

(65) Prior Publication Data
US 2012/0304150 A1 Nov. 29, 2012

(51) Int. Cl.
*G06F 9/44* (2006.01)
*G06F 9/54* (2006.01)
*G06F 9/455* (2006.01)

(52) U.S. Cl.
CPC . *G06F 9/541* (2013.01); *G06F 8/30* (2013.01); *G06F 9/45508* (2013.01); *G06F 9/45512* (2013.01)
USPC ........................................................ 717/115

(58) Field of Classification Search
CPC .... G06F 9/45512; G06F 9/45508; G06F 8/30
USPC .................................................. 717/115, 116
See application file for complete search history.

(56) References Cited

U.S. PATENT DOCUMENTS

| | | | |
|---|---|---|---|
| 5,471,619 | A | 11/1995 | Messina |
| 5,805,884 | A | 9/1998 | Sitbon et al. |
| 6,185,567 | B1 | 2/2001 | Ratnaraj et al. |
| 6,272,485 | B1 | 8/2001 | Sragner |

(Continued)

FOREIGN PATENT DOCUMENTS

| | | |
|---|---|---|
| JP | 11316677 | 11/1999 |
| JP | 2004054330 | 2/2004 |

(Continued)

OTHER PUBLICATIONS

"Microsoft Windows Internet Explorer and Other Trident Based Browsers", Retrieved from: <http://www.legendscrolls.co.uk/webstandards/ie> on May 25, 2011,(May 20, 2011),8 pages.

(Continued)

*Primary Examiner* — Anna Deng
(74) *Attorney, Agent, or Firm* — Andrew Sanders; Micky Minhas

(57) ABSTRACT

Various embodiments provide an interface between a Web browser's layout engine and a scripting engine. The interface enables objects from the layout engine to be recognized by a memory manager in the scripting engine and interact in a streamlined, efficient manner. In accordance with one or more embodiments, the interface allows browser layout engine objects to be created as objects that are native to the scripting engine. Alternately or additionally, in some embodiments, the native objects are further configured to proxy functionality between the layout engine and the scripting engine.

20 Claims, 22 Drawing Sheets

(56) References Cited

U.S. PATENT DOCUMENTS

| | | |
|---|---|---|
| 6,275,868 B1 | 8/2001 | Fraley et al. |
| 6,327,608 B1 | 12/2001 | Dillingham |
| 6,421,729 B1 | 7/2002 | Paltenghe et al. |
| 6,463,534 B1 | 10/2002 | Geiger et al. |
| 6,510,504 B2 | 1/2003 | Satyanarayanan |
| 6,546,397 B1 | 4/2003 | Rempell |
| 6,567,918 B1 | 5/2003 | Flynn et al. |
| 6,601,233 B1 | 7/2003 | Underwood |
| 6,629,123 B1 | 9/2003 | Hunt |
| 6,686,932 B2 | 2/2004 | Rath et al. |
| 6,717,593 B1 | 4/2004 | Jennings |
| 6,732,109 B2 | 5/2004 | Lindberg et al. |
| 6,748,418 B1 | 6/2004 | Yoshida et al. |
| 6,792,459 B2 | 9/2004 | Elnozahy et al. |
| 6,842,906 B1 | 1/2005 | Bowman-Amuah |
| 6,874,084 B1 | 3/2005 | Dobner et al. |
| 6,904,453 B2 | 6/2005 | Shuster et al. |
| 6,934,757 B1 | 8/2005 | Kalantar et al. |
| 6,950,983 B1 | 9/2005 | Snavely |
| 6,957,439 B1 * | 10/2005 | Lewallen ............... 719/328 |
| 6,959,393 B2 | 10/2005 | Hollis |
| 6,961,929 B1 | 11/2005 | Pelegri-Llopart et al. |
| 6,985,953 B1 | 1/2006 | Sandhu et al. |
| 6,990,653 B1 | 1/2006 | Burd et al. |
| 6,993,596 B2 | 1/2006 | Hinton et al. |
| 7,000,107 B2 | 2/2006 | Hewett et al. |
| 7,076,786 B2 | 7/2006 | Burd et al. |
| 7,143,195 B2 | 11/2006 | Vange |
| 7,143,347 B2 | 11/2006 | Su |
| 7,219,329 B2 | 5/2007 | Meijer et al. |
| 7,225,225 B2 | 5/2007 | Kuki et al. |
| 7,293,034 B2 | 11/2007 | Paya et al. |
| 7,334,235 B2 | 2/2008 | Hunt et al. |
| 7,340,604 B2 | 3/2008 | Hewett et al. |
| 7,359,976 B2 | 4/2008 | Ross et al. |
| 7,437,558 B2 | 10/2008 | Fenton et al. |
| 7,458,096 B2 | 11/2008 | Knouse et al. |
| 7,467,399 B2 | 12/2008 | Nadalin et al. |
| 7,469,302 B2 | 12/2008 | Whittle et al. |
| 7,487,262 B2 | 2/2009 | Cardina et al. |
| 7,584,232 B2 | 9/2009 | Guo |
| 7,730,465 B2 | 6/2010 | Sutter et al. |
| 7,735,094 B2 | 6/2010 | Varshney |
| 7,802,238 B2 | 9/2010 | Clinton |
| 7,809,785 B2 | 10/2010 | Appleton et al. |
| 7,870,112 B2 | 1/2011 | Karun et al. |
| 7,912,924 B1 | 3/2011 | Cantrell |
| 8,245,049 B2 | 8/2012 | Ramani et al. |
| 8,335,982 B1 | 12/2012 | Colton et al. |
| 8,646,029 B2 | 2/2014 | Leithead et al. |
| 8,689,182 B2 | 4/2014 | Leithead et al. |
| 2001/0051885 A1 | 12/2001 | Nardulli et al. |
| 2002/0007317 A1 | 1/2002 | Callaghan et al. |
| 2002/0116407 A1 | 8/2002 | Negishi et al. |
| 2002/0124172 A1 | 9/2002 | Manahan |
| 2002/0161835 A1 | 10/2002 | Ball et al. |
| 2002/0184491 A1 | 12/2002 | Morgan et al. |
| 2003/0023873 A1 | 1/2003 | Ben-Itzhak |
| 2003/0028762 A1 | 2/2003 | Trilli et al. |
| 2003/0093666 A1 | 5/2003 | Millen et al. |
| 2003/0159063 A1 | 8/2003 | Apfelbaum et al. |
| 2003/0177285 A1 | 9/2003 | Hunt et al. |
| 2004/0015580 A1 | 1/2004 | Lu et al. |
| 2004/0103200 A1 | 5/2004 | Ross et al. |
| 2004/0128546 A1 | 7/2004 | Blakley, III et al. |
| 2004/0139314 A1 | 7/2004 | Cook et al. |
| 2004/0205650 A1 | 10/2004 | Cheng |
| 2004/0210536 A1 | 10/2004 | Gudelj et al. |
| 2004/0260754 A1 | 12/2004 | Olson et al. |
| 2005/0028140 A1 | 2/2005 | Ayachitula et al. |
| 2005/0044197 A1 | 2/2005 | Lai |
| 2005/0050547 A1 | 3/2005 | Whittle et al. |
| 2005/0060427 A1 | 3/2005 | Phillips et al. |
| 2005/0108353 A1 | 5/2005 | Yamamoto |
| 2005/0174974 A1 | 8/2005 | Sonntag et al. |
| 2005/0177566 A1 | 8/2005 | Craig et al. |
| 2005/0187895 A1 | 8/2005 | Paya |
| 2005/0223412 A1 | 10/2005 | Nadalin et al. |
| 2005/0251742 A1 * | 11/2005 | Mogilevsky et al. ........ 715/521 |
| 2005/0259656 A1 | 11/2005 | Dollar et al. |
| 2005/0268100 A1 | 12/2005 | Gasparini et al. |
| 2005/0278792 A1 | 12/2005 | Ramani et al. |
| 2006/0010134 A1 | 1/2006 | Davis et al. |
| 2006/0026379 A1 | 2/2006 | Jung |
| 2006/0053276 A1 | 3/2006 | Lortz et al. |
| 2006/0053293 A1 | 3/2006 | Zager et al. |
| 2006/0087983 A1 * | 4/2006 | Vigoureux et al. ........... 370/252 |
| 2006/0143688 A1 | 6/2006 | Futoransky et al. |
| 2006/0218403 A1 | 9/2006 | Sauve et al. |
| 2006/0221941 A1 | 10/2006 | Kishinsky et al. |
| 2007/0006148 A1 * | 1/2007 | Varshney et al. ............. 717/115 |
| 2007/0050854 A1 | 3/2007 | Cooperstein et al. |
| 2007/0074169 A1 | 3/2007 | Chess et al. |
| 2007/0107057 A1 | 5/2007 | Chander et al. |
| 2007/0113282 A1 | 5/2007 | Ross |
| 2007/0136809 A1 | 6/2007 | Kim et al. |
| 2007/0150603 A1 | 6/2007 | Crull |
| 2007/0162394 A1 | 7/2007 | Zager et al. |
| 2007/0192494 A1 | 8/2007 | Yamakawa et al. |
| 2007/0234060 A1 | 10/2007 | Tsubono |
| 2007/0256003 A1 | 11/2007 | Wagoner et al. |
| 2007/0282951 A1 | 12/2007 | Selimis et al. |
| 2007/0288247 A1 | 12/2007 | Mackay |
| 2008/0034425 A1 | 2/2008 | Overcash et al. |
| 2008/0059634 A1 | 3/2008 | Commons |
| 2008/0133540 A1 | 6/2008 | Hubbard et al. |
| 2008/0235675 A1 | 9/2008 | Chen |
| 2008/0263086 A1 | 10/2008 | Klemba et al. |
| 2008/0298342 A1 | 12/2008 | Appleton et al. |
| 2008/0313648 A1 | 12/2008 | Wang et al. |
| 2009/0037806 A1 | 2/2009 | Yang et al. |
| 2009/0048915 A1 | 2/2009 | Chan |
| 2009/0070663 A1 * | 3/2009 | Fan et al. ...................... 715/234 |
| 2009/0070869 A1 | 3/2009 | Fan et al. |
| 2009/0119769 A1 | 5/2009 | Ross et al. |
| 2009/0125595 A1 | 5/2009 | Maes |
| 2009/0132713 A1 | 5/2009 | Dutta et al. |
| 2009/0161132 A1 | 6/2009 | Sato |
| 2009/0183227 A1 | 7/2009 | Isaacs et al. |
| 2009/0217311 A1 | 8/2009 | Kocyan et al. |
| 2010/0017461 A1 | 1/2010 | Kokkevis et al. |
| 2010/0023884 A1 | 1/2010 | Brichford et al. |
| 2010/0100823 A1 | 4/2010 | Ewe et al. |
| 2010/0125895 A1 | 5/2010 | Shull et al. |
| 2010/0262780 A1 | 10/2010 | Mahan et al. |
| 2010/0281537 A1 | 11/2010 | Wang et al. |
| 2010/0306642 A1 | 12/2010 | Lowet et al. |
| 2011/0015917 A1 | 1/2011 | Wang et al. |
| 2012/0297360 A1 | 11/2012 | Lucco et al. |
| 2012/0304044 A1 | 11/2012 | Leithead et al. |
| 2012/0304203 A1 | 11/2012 | Leithead et al. |
| 2012/0304303 A1 | 11/2012 | Leithead et al. |
| 2013/0042255 A1 | 2/2013 | Leithead et al. |
| 2013/0047064 A1 | 2/2013 | Leithead |
| 2013/0047258 A1 | 2/2013 | Leithead et al. |

FOREIGN PATENT DOCUMENTS

| | | |
|---|---|---|
| JP | 2004164617 | 6/2004 |
| JP | 2005092564 | 4/2005 |
| JP | 2006099460 | 4/2006 |
| JP | 2007047884 | 2/2007 |
| JP | 2007159013 | 6/2007 |
| JP | 2007183838 | 7/2007 |
| JP | 2007241809 | 9/2007 |
| JP | 2007241906 | 9/2007 |
| WO | WO-2005062707 | 7/2005 |
| WO | WO-2005091107 | 9/2005 |

OTHER PUBLICATIONS

De Keukelaera, Frederik et al., "SMash: Secure Component Model for Cross-Domain Mashups on Unmodified Browsers", *Proceeding*

(56) References Cited

OTHER PUBLICATIONS of the 17th International Conference on World Wide Web, Apr. 21-25, 2008, ACM Press, New York, NT, USA, (Apr. 21, 2008), 13 pages.

Grosskurth, Alan et al., "Architecture and Evolution of the Modern Web Browser", *David R. Cheriton School of Computer Science, University of Waterloo* Available at <http://grosskurth.ca/papers/browser-archevol-20060619.pdf>,(Jun. 2006),pp. 1-24.

Horak, Ales et al., "DEBVisDic—First Version of New Client-Server Wordnet Browsing and Editing Tool", *In Proceedings of GWC 2006*, Available at <https://www.cs.cas.cz/semweb/download.php?file=06-11-pala-etal&type=pdf>, (Jan. 2006),5 pages.

Nielson, Jordan et al., "Benchmarking Modern Web Browsers", *Department of Computer Science, University of Calgary*, Available at <http://www.aqualab.cs.northwestern.edu/HotWeb08/papers/Nielson-BMW.pdf>,(Oct. 2008),pp. 1-6.

"Restriction Requirement", U.S. Appl. No. 13/149,582, (Aug. 6, 2012), 5 pages.

"Microsoft Windows Script Interfaces—Introduction", Retrieved at <<http://msdn.microsoft.com/en-us/library/t9d4xf28 (v=vs.85).aspx>>, Retrieved Date: Jan. 28, 2011, pp. 3.

"Coding Basics—JavaScript Native Interface (JSNI)", Retrieved at <<http://code.google.com/webtoolkit/doc/1.6/DevGuideCodingBasics.html#DevGuideJavaScriptNativeInterface>>, Retrieved Date: Jan. 28, 2011, pp. 26.

"What's New in Internet Explorer 8", Retrieved at <<http://msdn.microsoft.com/en-us/library/cc288472(v=vs.85).aspx>>, Retrieved Date: Jan. 28, 2011, pp. 15.

"Mozilla Application Framework in Detail", Retrieved at <<https://developer.mozilla.org/en/mozilla_application_framework_in_detail>>, Retrieved Date: Jan. 28, 2011, pp. 6.

"Info: Develop Microsoft Office Solutions with Visual Studio .NET", retrieved from http://support.microsoft.com/kb/311452 on Aug. 10, 2010, (May 9, 2007), 10 pages.

"Microsoft Security Program: Microsoft Security Bulletin—MS98-020—Patch Available for Frame Spoof Vulnerability", Retrieved from: <http://www.microsoft.com/technet/security/bulletin/ms98-020.mspx> on Jul. 10, 2010, (Dec. 23, 1998), 2 pages.

"Microsoft.NET/COM Migration and Interoperability", *Microsoft Patterns & Practices; Proven Practices for Predictable Results* available through http://www.msdn.microsoft.com/practices/default.aspx, (2010), 15 pages.

"Netscape Security News Archive", Available at <http://netscape.1command.com/relnotes/>,(1997), 14 pages.

"Non-Final Office Action", U.S. Appl. No. 10/867,338, (Apr. 21, 2010), 15 pages.

"Non-Final Office Action", U.S. Appl. No. 10/867,338, (Jul. 14, 2010), 15 pages.

"Non-Final Office Action", U.S. Appl. No. 13/150,877, (Apr. 30, 2013), 29 pages.

"Non-Final Office Action", U.S. Appl. No. 13/656,156, (Apr. 2, 2013), 13 pages.

"Notice of Allowance", U.S. Appl. No. 10/867,338, (Apr. 12, 2012), 8 pages.

"Reference Counting", retrieved from http://en.academic.ru/dic.nsf/enwiki/16265 on Aug. 10, 2010, 6 pages.

"Requirement for Information", U.S. Appl. No. 10/867,338, (Oct. 26, 2010), 7 pages.

"Restriction Requirement", U.S. Appl. No. 13/150,877, (Feb. 25, 2013), 6 pages.

"Restriction Requirement", U.S. Appl. No. 13/656,156, (Feb. 21, 2013), 6 pages.

"Update Available for "Frame Spoof" Security Issue", Retrieved from: <http://support.microsoft.com/default.aspx?scid=kd;en-us;167614&sd=tech> on Apr. 21, 2011,(Aug. 23, 2007), 3 pages.

Barth, Adam "Securing Frame Communication in Browsers", *Communications of the ACM*, vol. 52, No. 6, (Jun. 2009), pp. 83-91.

Festa, Paul "Communicator subject to frame-spoofing", Retrieved from <http://news.cnet.com/2100-1023-21975.html&tag=mncol%3btxt> on Oct. 11, 2010, (Jan. 5, 1999), 1 page.

Plášil, František et al., "An Architectrual View of Distributed Objects and Components in CORBA, Java RMI, and COM/DCOM", *A submission to Software—Concepts & Tools*, ver. 052498, 66, Springer, (1998), 21 pages.

Samarati, Pierangela et al., "An Authorization Model for a Distributed Hypertext System", *IEEE Transactions on Knowledge and Data Engineering*, vol. 8, No. 4, (Aug. 1996), pp. 555-562.

Tierney, Luke "Connection Lisp-Stat to COM", (Jan. 10, 2000), 10 pages.

Wang, Helen J., et al., "Protection and Communication Abstractions for Web Browsers in MashupOS", SOSP07, ACM, Oct. 14-17, 2007, 15 pages.

Zhuang, Xiaoyu "Interaction Between Web Browsers and Script Engines", *In Student Thesis, Master Programme in Computer Science, Uppsala University*, Available at <http://uu.diva-portal.org/smash/get/diva2:566712/FULLTEXT01>,(Nov. 2012), 63 pages.

"Advanced Server-Side Authentication for Data Connections in InfoPath 2007 Web Based Forms", http://msdn2.microsoft.com/en-us/library/bb787184.aspx#ip2007AdvancedServerSideAuthentication_OverviewofServerSideAuthenticationScenarios, (Sep. 2007), 10 pages.

"Final Office Action", U.S. Appl. No. 11/935,323, (Jul. 18, 2011), 15 pages.

"Final Office Action", U.S. Appl. No. 11/942,734, (Jan. 21, 2010), 36 pages.

"Final Office Action", U.S. Appl. No. 11/942,734, (Apr. 5, 2011), 45 pages.

"Final Office Action", U.S. Appl. No. 11/942,734, (Sep. 13, 2010), 38 pages.

"Flash Cross Domain XML", http://www.w3.org/TR/2007/WD-access-control-20071001, (Nov. 3, 2007), 1-1.

"Non Final Office Action", U.S. Appl. No. 11/935,323, (Nov. 5, 2010), 11 pages.

"Non-Final Office Action", U.S. Appl. No. 11/150,869, (Sep. 3, 2009), 9 pages.

"Non-Final Office Action", U.S. Appl. No. 11/942,734, (Aug. 7, 2009), 31 pages.

"Non-Final Office Action", U.S. Appl. No. 11/942,734, (Nov. 18, 2010), 43 pages.

"Non-Final Office Action", U.S. Appl. No. 11/942,734, (May 3, 2010), 32 pages.

"NoScript", 2004-2007, *Inform Action*, retrieved from <http://noscript.net/features> on Aug. 23, 2007, 5 pages.

"Notice of Allowance", U.S. Appl. No. 10/303,113, (Dec. 10, 2007), 11 pages.

"Notice of Allowance", U.S. Appl. No. 11/150,869, (Feb. 9, 2010), 8 pages.

"Protecting Commercial Secure Web Servers from Key-Finding Threats", *nCipher, Inc.*, Available at <www.ncipher.com/uploads/resources/pcws.pdf>,(1999), 12 pages.

"Randomization of HTML Tags and Embedded Scripts in Web Pages", *Microsoft Research*, 2139156v2, retrieved on Nov. 5, 2007, 14 pages.

"Restriction Requirement", U.S. Appl. No. 11/150,869, (May 20, 2009), 6 pages.

"Tagneto", http://tagneto.blogspot.com/2006/10/ie-7-and-iframe-apis-part-2.html, (Nov. 3, 2007), pp. 1-5.

"Why XHR Should Become Opt-In Cross-Domain", http://www.webkitchen.co.uk/2006/07/why-xhr-should-become-opt-in-cross.html.

Amato, Gianni "Protect Your Browser Mozilla Firefox from XSS Attacks", *XSS Warning: Security extension for Mozilla Firefox*, retrieved from <http://www.gianniamato.it/project/extension/xsswarning/> on Nov. 5, 2007,(2007), 1 page.

Anupam, et al., "Secure Web Scripting", *1998 IEEE*, (1998), pp. 46-55.

Chang, Bernice et al., "A Client-Side Browser-Integrated Solution for Detecting and Preventing Cross Site Scripting (XSS) Attacks",

(56) References Cited

OTHER PUBLICATIONS available at <http://www.eecg.toronto.edu/~lie/Courses/ECE1776-2006/Updates/XSS_update.pdf>,(Sep. 25, 2006), 3 pages.
Couvreur, Juien "Curiosity is Bliss: Web API Authentication for Mashups", Available at http://blog.monstuff.com/_archives/000296.html, (Jun. 25, 2006), 5 pages.
Crockford, Douglas "JSONRequest", Retrieved from: <http://json.org/JSONRequest.html> on Nov. 3, 2007, (Apr. 17, 2006), 8 pages.
Herzberg, Amir et al., "Protecting (even) Naive Web Users, or: Preventing Spoofing and Establishing Credentials of Web Sites", *Bar Ilan University*, Available at <www.cs.bu.ac.il/~herzea/papers/ecommerce/trusted credentials area.pdf>,(Jul. 18, 2004), 26 pages.
Jackson, Collin et al., "Subspace: Secure CrossDomain Communication for Web Mashups", *In Proceedings of the International World Wide Web Conference Committee (IW3C2)*, May 8-12, 2007, available at <http://citeseerx.ist.psu.edu/viewdoc/download?doi=10.1.1.123.1586&rep=rep1&type=pdf>,(May 8, 2007), 10 pages.
Jim, Trevor et al., "Defeating Script Injection Attacks with Browser-Enforced Embedded Policies", *In Proceedings of WWW 2007*, May 8-12, 2007, available at <http://www2007.org/papers/paper595.pdf>,(May 8, 2007), pp. 601-610.
Kaminsky, Dan "Black Ops 2007: Design Reviewing The Web", *IOActive Comprehensive Computer Security Services*, Available at <http://www.doxpara.com/DMK_BO2K7_Web.ppt>,(2007), 67 pages.
Karlof, Chris et al., "Dynamic Pharming Attacks and Locked Same-origin Policies for Web Browsers", In Proceedings of CCS 2007,(Nov. 2007), pp. 58-71.
Kirda, Engin et al., "Noxes: A Client-Side Solution for Mitigating Cross-Site Scripting Attacks", *Proceedings of SAC '06*, Apr. 23-27, 2006, available at <http://www.seclab.tuwien.ac.at/papers/noxes.pdf>,(Apr. 23, 2006), 8 pages.
Levin, Lori et al., "The JANUS-III Translation System: Speech-to-Speech Translation in Multiple Domains", Machine Translation, vol. 15,(2000), pp. 3-25.
Ley, Jim "Using the XML HTTP Request object", Retrieved from: <http://www.jibbering.com/2002/4/httprequest.2005.8.html> on Nov. 4, 2010, (Apr. 2002), 6 pages.
Matthies, Christian "DNS Pinning Explained", Retrieved from: <http://christ1an.blogspot.com/2007/07/dns-pinning-explained.html> on Nov. 3, 2007, (Jul. 1, 2007), 12 pages.
Miyamoto, Daisuke et al., "SPS: A Simple Filtering Algorithm to Thwart Phishing Attacks", *AINTEC 2005*, (2005), 15 pages.
Novak, Mark "Extending SDL: Documenting and Evaluating the Security Guarantees of Your Apps", *MSDN Magazine*, available at <http://msdn.microsoft.com/en-us/magazine/cc163522.aspx>,(Nov. 2006), 6 pages.
Radosevic, Danijel et al., "Development of a Higher-Level Multimedia Scripting Language", *23rd Int. Conf. Information Technology Interfaces ITI 2001*, (Jun. 19, 2001), pp. 201-208.
Spanias, Andreas et al., "Development of New Functions and Scripting Capabilities in Javaa-DSP for Easy Creation and Seamless Integration of Animated DSP Simulations in Web Courses", *2001 IEEE*, (2001), pp. 2717-2720.
Tam, et al., "A Fast and Flexible Framework of Scripting for Web Application Development: A Preliminary Experience Report", *2000 IEEE*, (2000), pp. 450-455.
Van Kesteren, Anne "Cross Domain HXR Enabling Read Access for Web Resourced", http://www.w3.org/TR/2007/WD-access-control-20071001/, (Nov. 3, 2007),1-12.
Verisign Inc., "Licensing VeriSign Certificates: Securing Multiple Web Server and Domain Configurations", *White Paper*, Available at <www.msctrustgate.com/pdf/licensing.pdf>,(Nov. 2, 2001), 15 pages.
Zoline, Kenneth O., "An Approach for Interconnections SNA and XNS Networks", In Proceedings of SIGCOMM 1985,(1985), pp. 184-198.
"Non-Final Office Action", U.S. Appl. No. 13/149,582, (Jan. 7, 2013), 12 pages.
"Non-Final Office Action", U.S. Appl. No. 13/149,645, (Nov. 23, 2012), 19 pages.
"Non-Final Office Action", U.S. Appl. No. 13/656,245, (Feb. 1, 2013), 26 pages.
"Non-Final Office Action", U.S. Appl. No. 13/658,668, (Jan. 3, 2013), 18 pages.
Hunt, Galen et al., "Detours: Binary Interception of Win32 Functions", *Proceedings of the 3rd US EN IX Windows NT Symposium*, (Jul. 1999), pp. 1-9.
"Final Office Action", U.S. Appl. No. 13/149,645, (Jun. 20, 2013), 25 pages.
"Final Office Action", U.S. Appl. No. 13/656,156, (Sep. 17, 2013), 15 pages.
"Final Office Action", U.S. Appl. No. 13/658,668, (Jun. 18, 2013), 26 pages.
"Non-Final Office Action", U.S. Appl. No. 13/111,927, (Aug. 1, 2013), 23 pages.
"Non-Final Office Action", U.S. Appl. No. 13/656,245, (Aug. 2, 2013), 16 pages.
"Notice of Allowance", U.S. Appl. No. 13/149,582, (Sep. 18, 2013), 15 pages.
"Notice of Allowance", U.S. Appl. No. 13/656,245, (Oct. 28, 2013), 14 pages.
Dowd, Mark et al., "Attacking Interoperability", *Version 1.0; Black Hat, USA*, (Jul. 29, 2009), 84 pages.
"Final Office Action", U.S. Appl. No. 13/111,927, Feb. 27, 2014, 28 pages.
Langer, "Bringing COM Technology to Alignment Software", Stanford Linear Accelerator Center, Stanford University, Nov. 2002, 16 Pages.
"Extended European Search Report", EP Application No. 08848369.8, Oct. 14, 2013, 6 pages.
"Final Office Action", U.S. Appl. No. 13/150,877, Jan. 13, 2014, 18 pages.
"Foreign Office Action", CN Application No. 200880115316.8, Mar. 20, 2012, 13 pages.
"Foreign Office Action", CN Application No. 200880115316.8, Jun. 8, 2013, 12 pages.
"Foreign Office Action", CN Application No. 200880115316.8, Jun. 27, 2012, 12 pages.
"Foreign Office Action", CN Application No. 200880115316.8, Sep. 27, 2012, 6 pages.
"Foreign Office Action", CN Application No. 200880115316.8, Oct. 25, 2011, 11 pages.
"Foreign Office Action", JP Application No. 2010-533140, Apr. 26, 2013, 11 pages.
"Foreign Office Action", JP Application No. 2010-533140, Sep. 24, 2013, 4 pages.
"International Search Report and Written Opinion", Application No. PCT/US2008/079989, Apr. 15, 2009, 10 pages.
"Non-Final Office Action", U.S. Appl. No. 11/935,323, Dec. 18, 2013, 16 Pages.
"Notice of Preliminary Examination", CN Application No. 200880115316.8, Oct. 12, 2010, 2 pages.
"Examiner's Answer to Appeal Brief", U.S. Appl. No. 13/149,645, Jul. 28, 2014, 48 pages.
"Examiner's Answer to Appeal Brief", U.S. Appl. No. 13/658,668, Aug. 1, 2014, 49 pages.
"Notice of Allowance", U.S. Appl. No. 13/150,877, Jul. 22, 2014, 12 pages.
"Notice of Allowance", U.S. Appl. No. 13/656,156, Jul. 18, 2014, 7 pages.

* cited by examiner

BINDING BETWEEN A LAYOUT ENGINE AND A SCRIPTING ENGINE

BACKGROUND

Over time, Web pages have evolved to include complex operations that can alter and/or modify a document being rendered in a host environment. In order to achieve some of these complex operations, Web programmers can utilize scripting languages to work within the host environment and with the document being rendered. Many host environments distinguish between a layout engine, which facilitates the rendering of a document, and a scripting engine, which executes script included in an associated Web page. Scripts running in the scripting engine can be designed to access not only the document being rendered in the layout engine, but objects and/or elements within the document. In some cases, when a layout engine supports standardized document access, such as a Document Object Model (DOM), a Web programmer can write a script to manipulate a document and its elements based upon this model.

A layout engine and a scripting engine provide different functionality from one another and, as such, they typically reside, on some level, in separate modules. This can range from a simple logical separation to a more complex separation between software and/or hardware components. More often, these engines reside in separate and/or associated software modules that communicate with one another. One benefit of this separation is that it enables a layout engine to more easily support multiple scripting engines. However, since the layout engine is separated, on some level, from a scripting engine, communication mechanisms between the modules oftentimes limit what can be exposed between the modules, can adversely affect runtime performance, and can introduce unintended memory management issues.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide an interface between a Web browser's layout engine and a scripting engine. The interface enables objects from the layout engine to be recognized by a memory manager in the scripting engine and interact with the scripting engine in a streamlined, efficient manner. In accordance with one or more embodiments, the interface allows browser objects to be created as objects that are native to the scripting engine. Alternately or additionally, in some embodiments, the native objects are further configured to proxy functionality between the layout engine and the scripting engine.

In some embodiments, binding between the Web browser's layout engine and the scripting engine can include features configured to enable unified programming access between the layout engine and the scripting engine. The features can be configured to enhance memory management, enable direct access between the layout engine and scripting engine, and/or enable mutability of a dual nature object.

Various embodiments can also provide a security model that enables secure interactions between scripting engines residing in separate domains. In some cases, protections can be employed to prevent object access and/or restrict access to type system information. Alternately or additionally, functions that include cross-domain access functionality can be marked as safe. In some embodiments, a sub-window proxy can provide secure transactions across multiple domains to one or more sub-objects associated with a window.

BRIEF DESCRIPTION OF THE DRAWINGS

The same numbers are used throughout the drawings to reference like features.

DETAILED DESCRIPTION

Overview

Figure 1:
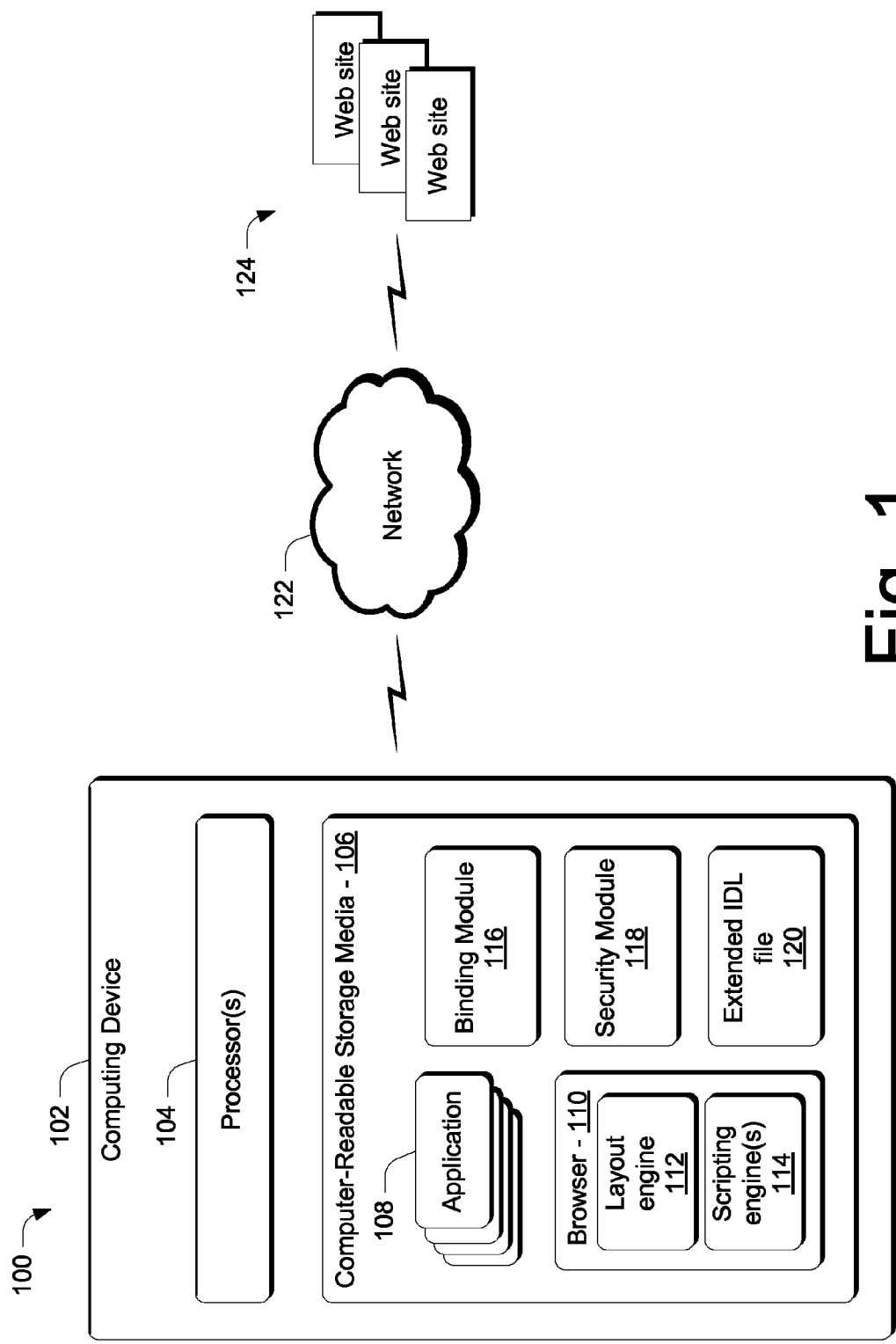
FIG. 1 illustrates an operating environment in which various principles described herein can be employed in accordance with one or more embodiments.

Various embodiments provide an interface between a Web browser's layout engine and a scripting engine. Typically, as an overview to an example process, a user will open a Web browser and navigate to a Web page. The Web page can be configured to determine what version of the Web browser is running, such as what features are supported. At some point while the Web page is being rendered, a scripting engine can be created, such as through a dynamic request for functionality (e.g. IDispatchEx), or through a script being parsed. In some embodiments, creation and/or initialization of the scripting engine can include registering a type system, establishing various relationships between the scripting engine and the Web browser's layout engine, as well as constructing bindings that are associated with the various relationships, as will be described below in detail. In some cases, the user may navigate to a second Web page. Upon transitioning to the second Web page, the Web browser can be configured to create a new scripting engine associated with the second page, transfer objects from the first scripting engine to the new scripting engine, and then close the first scripting engine.

The interface and bindings enable various objects from the layout engine to be recognized by a memory manager in the scripting engine and interact with the scripting engine in a streamlined, efficient manner. In accordance with one or more embodiments, the interface allows browser objects to be created as objects that are native to the scripting engine. Alternately or additionally, in some embodiments, the native objects are further configured to proxy functionality between the layout engine and the scripting engine.

In some embodiments, binding between the Web browser's layout engine and the scripting engine can include features configured to enable unified programming access between the layout engine and the scripting engine. The features can be configured to enhance memory management, enable direct access between the layout engine and scripting engine, and/or enable mutability of a dual nature object.

Various embodiments can also provide a security model that enables secure interactions between scripting engines residing in separate domains. In some cases, protections can be employed to prevent object access and/or restrict access to type system information. Alternately or additionally, functions that include cross-domain access functionality can be marked as safe. In some embodiments, a sub-window proxy can provide secure transactions across multiple domains to one or more sub-objects associated with a window.

In one or more embodiments, extensions to an Interface Definition Language (IDL) can enable direct integration of a layout engine and a scripting engine. In some embodiments, the extended IDL can enable generation of code configured to bridge the layout engine and scripting engine. Alternately or additionally, hierarchical relationships between objects and their associated APIs can be described using the extended IDL. In some embodiments, the extended IDL can include syntax to describe attributes of the objects and/or the associated APIs.

In the discussion that follows, a section entitled "Operating Environment" is provided and describes one environment in which one or more embodiments can be employed. Following this, a section entitled "Object Integration and Memory Model" describes an architecture that enables objects from a Web browser's layout engine to be recognized by a memory manager in a scripting engine, and further enables streamlined interactions between the engines. After this, a section entitled "Direct System Integration" describes provided features that enable direct system integration between a layout engine and a scripting engine. Next, a section entitled "Security Model" describes how security can be enforced in accordance with one or more embodiments. Following this, a section entitled "Interface Definition Language Integration" describes how an interface definition language can be extended to define a hierarchy of objects and their associated APIs and/or attributes. After this, a section entitled "Other Considerations" describes additional considerations and/or features. Last, a section entitled "Example System" describes an example system that can be utilized to implement one or more embodiments.

Having provided an overview of various embodiments that are to be described below, consider now an example operating environment in which one or more embodiments can be implemented.

Operating Environment

FIG. 1 illustrates an operating environment in accordance with one or more embodiments, generally at 100. Environment 100 includes a computing device 102 having one or more processors 104, one or more computer-readable storage media 106 and one or more applications 108 that reside on the computer-readable storage media and which are executable by the processor(s). The computer-readable storage media can include, by way of example and not limitation, all forms of volatile and non-volatile memory and/or storage media that are typically associated with a computing device. Such media can include ROM, RAM, flash memory, hard disk, removable media and the like. One specific example of a computing device is shown and described below in FIG. 21.

In addition, computing device 102 includes a software application in the form of a Web browser 110. Any suitable Web browser can be used examples of which are available from the assignee of this document and others. Browser 110 can include or utilize separate modules in its functionality, such as layout engine 112 and scripting engine(s) 114. Layout engine 112 includes functionality that can, among other things, process marked up content (such as HTML, XML, image files, etc.) and formatting information (such as CSS, XSL, etc.) to render and/or display formatted content. Scripting engine(s) 114 include functionality that can process and execute scripting language code. While illustrated as being incorporated into browser 110, it is to be appreciated and understood that scripting engine(s) 114 can be implemented as standalone components. Alternately or additionally, scripting engine(s) 114 can be implemented as part of applications 108 and/or part of the system's operating system.

Computing device 102 also includes a binding module 116, which includes functionality that enables layout engine 112 and scripting engine 114 to bind, interface, and/or communicate with one another, as described in more detail below.

In addition, computing device 102 also includes a security module 118, which includes functionality that enables cross-domain security to be enforced with scripting engine 114 and/or layout engine 112, as well as for efficiencies to be enhanced for same-origin requests, as described below. In some embodiments, security module 118 includes features and/or functionality incorporated into and/or utilized by layout engine 112 and/or scripting engine 114, as further described below.

In one or more embodiments, computing device 102 also includes one or more extended Interface Definition Language (IDL) files 120. An extended IDL file 120 can include various extensions to an IDL that enable further description and/or definition for objects and their associated Application Programming Interfaces (APIs), as further described below.

In addition, environment 100 includes a network 122, such as the Internet, and one or more Web sites 124 from and to which content can be received and sent. Such content can include any type of content that is typically received and processed by browser 110.

Computing device 102 can be embodied as any suitable computing device such as, by way of example and not limitation, a desktop computer, a portable computer, a handheld computer such as a personal digital assistant (PDA), cell phone, and the like.

Having described an example operating environment, consider now a discussion of object integration and a memory model that enables a Web browser's layout engine to interface with one or more scripting engines in an efficient and streamlined manner.

Object Integration and Memory Model

In accordance with one or more embodiments, an interface between a Web browser's layout engine and scripting engine enables objects from the layout engine to be integrated into the scripting engine memory space. For example, in some embodiments, objects native to the scripting engine memory space can be bound to objects associated with the layout engine memory space. To access the layout engine objects, the scripting engine can access the objects native to scripting engine memory space. The native objects can be further configured to proxy functionality between the layout engine and the scripting engine.

Figure 2:
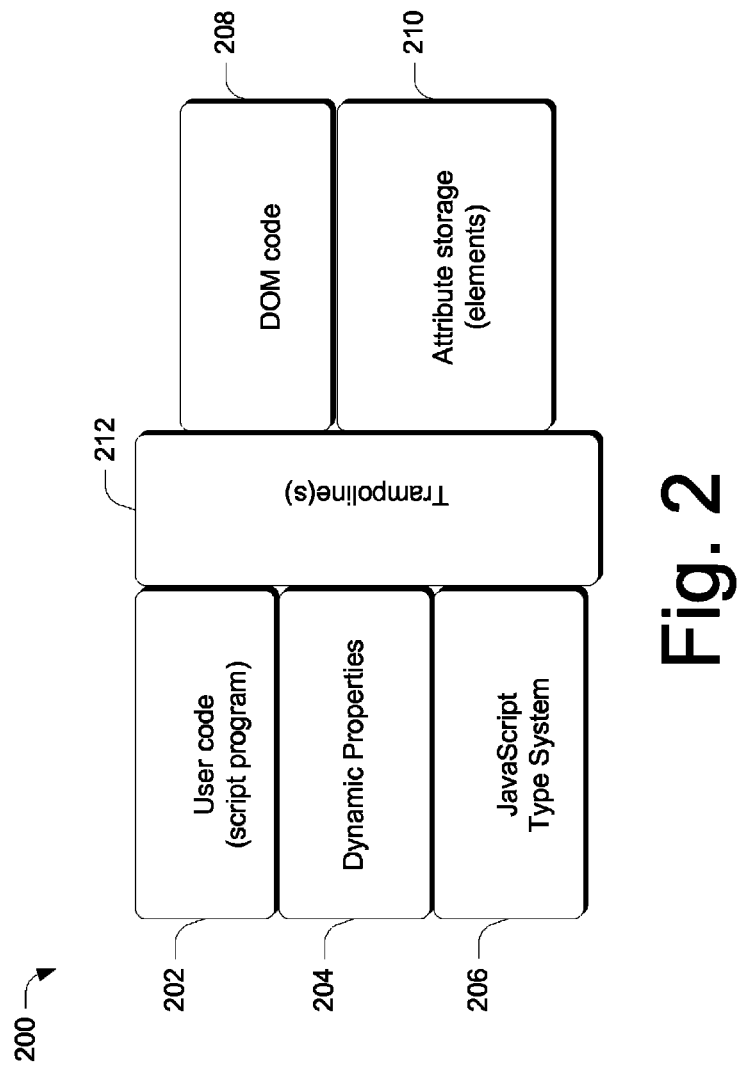
FIG. 2 illustrates a relationship diagram in accordance with one or more embodiments.

As an example, consider FIG. 2, which illustrates relationship block diagram 200 depicting a relationship between a scripting engine (the scripting engine side) and a layout engine (the layout engine side) in accordance with one or more embodiments. The scripting engine side includes three functional blocks: user code (script program) 202, dynamic properties 204 and JavaScript Type System 206. The layout engine side includes two functional blocks: document management code 208, illustrated here as Document Object Model (DOM) code, and attribute storage (elements) 210. While this example illustrates the scripting engine as a JavaScript engine and the layout engine as including a DOM as its standardized document access, it is to be appreciated and understood that any type of script language and/or standardized document access could be utilized without departing from the spirit of the claimed subject matter.

In the illustrated and described embodiment, one or more trampolines 212 are logically interposed between the scripting engine and the layout engine. As will become apparent below, the trampoline serves to enable the scripting engine and layout engine to communicate and call functionality between each other.

In the illustrated and described embodiment, user script code 202 comprises script code that can be interpreted and executed by the scripting engine, as will be appreciated by the skilled artisan. In some embodiments, user script code 202 can include script code from Web pages. Among other things, user script code 202 can include script that enables interaction with a host environment rendering a particular Web page. Script code can be embedded in or included from HTML pages and can interact with the DOM of the Web page. Typical, simple uses of script code include, by way of example and not limitation, opening or popping up a new window with programmatic control over size, position and attributes; validating input values of a Web form to ensure that the values are acceptable before being submitted to a server; and changing images as the mouse cursor moves over them.

Dynamic properties 204 enable an ability to set and/or change properties of objects associated with the scripting language and/or scripting engine dynamically. In addition to setting and/or changing properties of scripting language objects, dynamic properties 204 include the ability to dynamically set and/or change properties associated with objects in the layout engine, such as, by way of example and not limitation, various DOM objects included in and/or associated with document object management code 208. Alternately or additionally, dynamic properties 204 can include properties, prototypes, and/or objects created through execution of user code 202. It should be noted that dynamic properties 204, regardless of their associated object(s), can be stored entirely in memory that is managed through the scripting engine.

In one or more embodiments, type system 206 is configured to associate a type with an object and/or value such that the value and/or object can be properly accessed. For example, a type system can ensure that a correct prototype is used for the object and/or value. Alternately or additionally, type system 206 can be configured to dynamically type objects and/or values. In some embodiments, type system 206 can include type system information associated with one or more objects in document object management code 208.

On the layout engine side, document management code 208 includes functionality that enables the layout engine to create, manage, and/or render documents. Document management code 208 can also enable external exposure and/or access of or to document(s). For example, a Web page can include user script code that, when running in a scripting engine, can use the external access of a document to program interactive features onto the document. In the illustrated and described embodiment, dynamic properties 204 include dynamic properties of document management code 208 and are stored in the scripting engine memory space. Conversely, attributes storage 210, as illustrated here, utilizes layout engine memory space. Attributes storage 210 can include static attributes and/or elements associated with document management code 208.

In one or more embodiments, trampoline(s) 212, logically interposed between the scripting engine side and the layout engine side, represents at least one bridge between the scripting engine and the layout engine. As illustrated, trampoline 212 can be logically positioned between the scripting engine and the layout engine and, in at least some embodiments, can be configured redirect a call from an object in the scripting engine memory space into a related object in the layout engine memory space, as further discussed below. Thus, the trampoline serves as a redirection mechanism in which the scripting engine can directly call a function associated with an object native to the scripting engine, yet have the call redirected to the layout engine for actual workload execution. Such a redirection mechanism enables the two engines to communicate without the need to request interface pointers, identification values, and the like. Accordingly, the scripting engine and the layout engine can now be more tightly bound and have a wider range of access to cross-engine objects.

Figure 3:
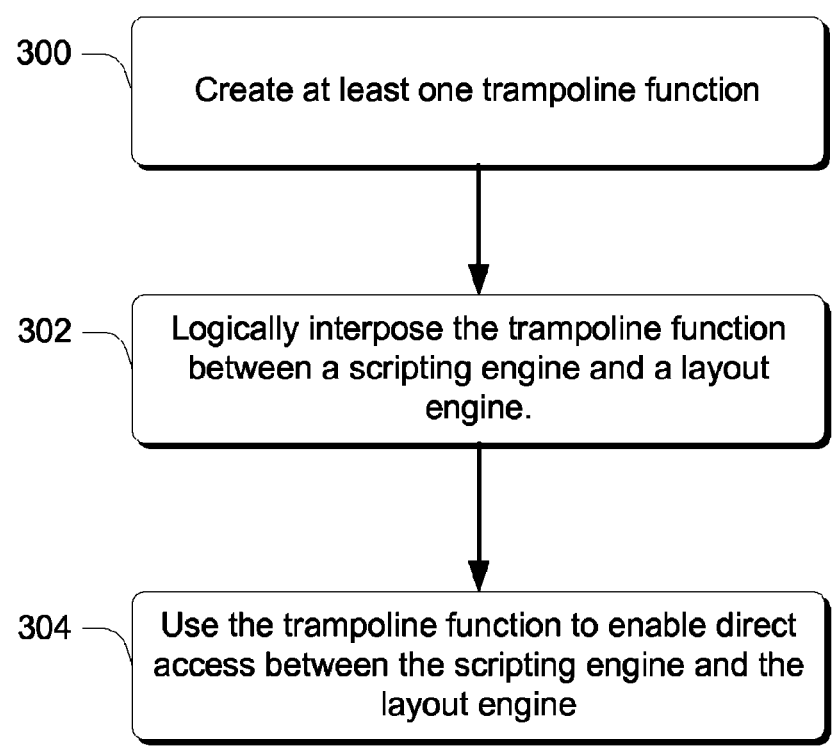
FIG. 3 is a flow diagram that describes steps in a method in accordance with one or more embodiments.

As an example, consider FIG. 3, which illustrates a flow diagram that describes steps in a method in accordance with one or more embodiments. The method can be performed by any suitable hardware, software, firmware, or combination thereof In at least some embodiments, aspects of the method are performed by a system, such as the system illustrated in FIGS. 1 and 2.

Step 300 creates at least one trampoline function. The trampoline function can be created in any suitable way, such as through C++ source and header files, as further described in a section entitled "Interface Definition Language Integration" below. Step 302 logically interposes the trampoline function between a scripting engine and a layout engine. Interposing the trampoline function between the two engines enables an ability to call functionality across the engines. Using the trampoline function, step 304 enables direct access between the scripting engine and the layout engine. For instance, the trampoline function can be configured to enable calls from the scripting engine to be redirected as appropriate to the layout engine, as further described above and below in a section entitled "Dynamic Type System Direct Functions".

Figure 4:
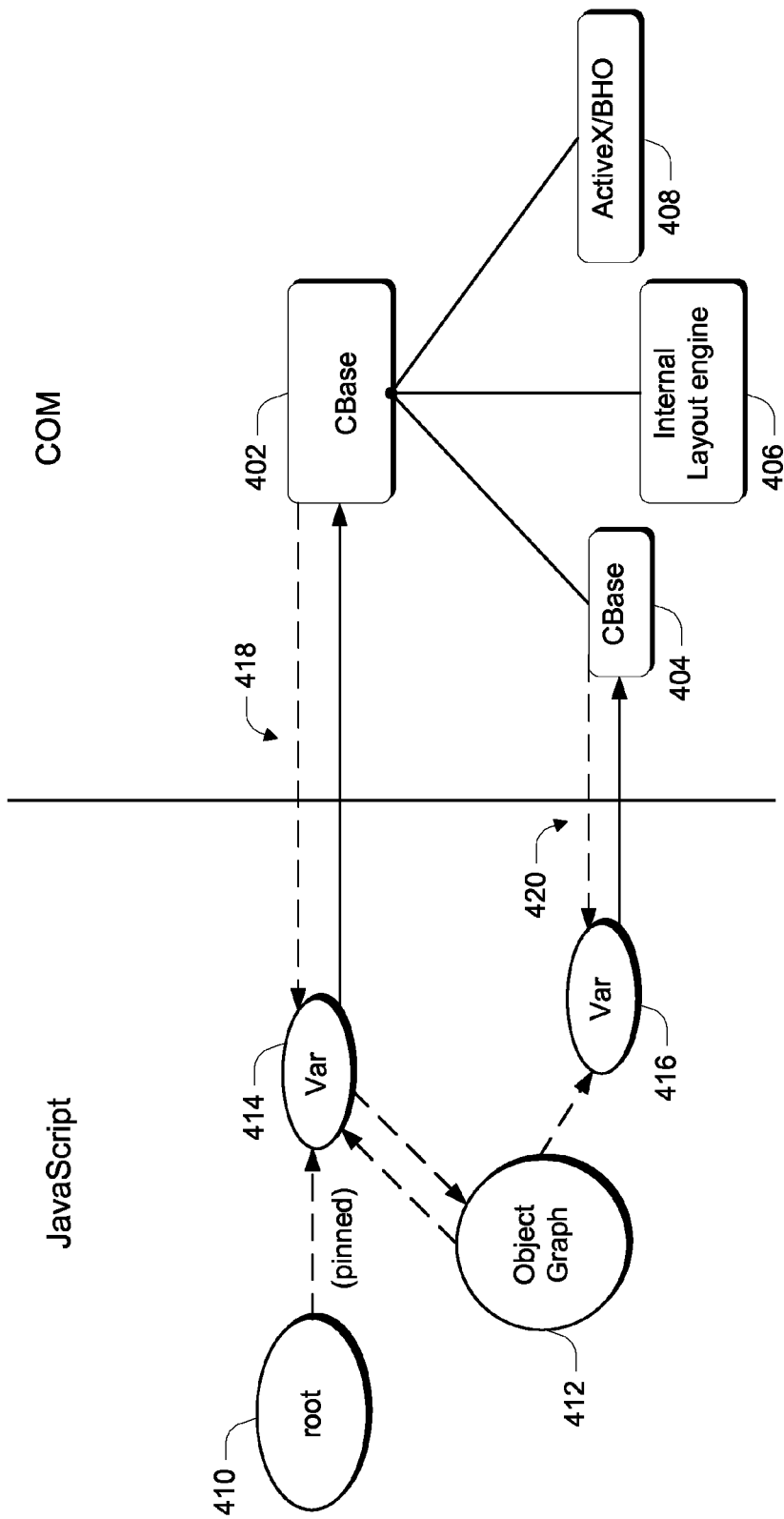
FIG. 4 illustrates object relationships in a memory model in accordance with one or more embodiments.

Having described a relationship between a scripting engine, a layout engine, and trampoline functions, consider now FIG. 4, which illustrates object relationships in a memory model that includes scripting engine memory space (designated "JavaScript") and layout engine memory space (designated "COM" to represent a Component Object Model (COM) based layout engine).

The layout engine memory space includes a variety of objects, including a CBase object 402 that represents a COM based object with relationships to other objects, such as CBase object 404, Internal Layout Engine object 406 and ActiveX/BHO object 408 (where "BHO" stands for "Browser Helper Object").

The scripting engine memory space includes a variety of objects, such as root object 410, object graph object 412, and var objects 414, 416. Root object 410 represents a pinned object to which var object 414 is rooted or attached, and object graph 412 represents an object relationship graph of objects in the scripting engine memory space that are managed by a memory system manager. The scripting engine memory space has access and/or bindings to the layout engine memory space through access links, such as links 418, 420.

In the illustrated and described embodiment, each side of the memory model includes at least some objects that are associated with at least one object on the other side of the memory model. For example, CBase object 404 is linked and/or bound to var object 416 through linkage 420, and CBase object 402 is similarly linked and/or bound to var object 414 through linkage 418. Various mechanisms can be used to link and/or bind objects, as further discussed below.

In some embodiments, CBase objects 402, 404 contain actual implementations for functionality, which can be accessed via direct functions and/or type operations configured to proxy or "forward" requests from the scripting engine to the CBase objects 402, 404. For example, a script running in the scripting engine has access to var objects 414, 416, which are native to the scripting engine memory space. The script does not necessarily have to have knowledge of the associated CBase objects, nor the associated linkages. Instead, the script can access the var objects as native objects to access, request, and/or make calls or requests associated with certain functionality and information. In turn, direct functions and/or type operations that can be associated with var objects 414, 416 can be configured to proxy and/or forward the call to an associated CBase object for actual execution of the call or request. This relationship enables the existence of an object that is, in a sense, dual in nature. Specifically, an object can exist in the layout engine and can have an associated native representation created and maintained in the scripting engine.

Part of managing an object's dual nature includes managing a so-called lifetime relationship between an object in the scripting engine, such as var object 416, and the corresponding object in the layout engine, such as CBase object 404. For example, if var object 416 is actively being used by a script, corresponding CBase object 404 will also be actively used.

In some cases, the memory management system can implement automatic memory management, also referred to as "garbage collection", which attempts to reclaim memory when the memory is determined to no longer be in use. A more manual method of memory management in a garbage collected system involves pinning an object, such that the garbage collector is not allowed to reclaim the object memory space until the object is manually unpinned. If an object is reclaimed prematurely, the linkage between the dual nature object can be broken. Conversely, an object can be marked as active multiple times, thus creating a potential memory leak, meaning that the memory is not reclaimed, if all of the multiple active markings are not properly cleared.

In some embodiments, an object graph, such as object graph 412, can be maintained by a garbage collector to identify what may be a reclaimable object. An object can maintain active participation in the object graph, and subsequently the garbage collector, through the use of the var objects. This active participation enables an object to maintain its lifespan without requiring the object to be pinned.

In some embodiments, when a scripting language object associated with a dual nature object is created, its identity can be bound with the layout engine object using an object, referred to herein as "CustomExternalObject," with expanded custom data, described just below. Furthermore, the CustomExternalObject can expose relationships to a garbage collector, thus enabling the garbage collector to more accurately track when an object can be recycled.

Figure 5:
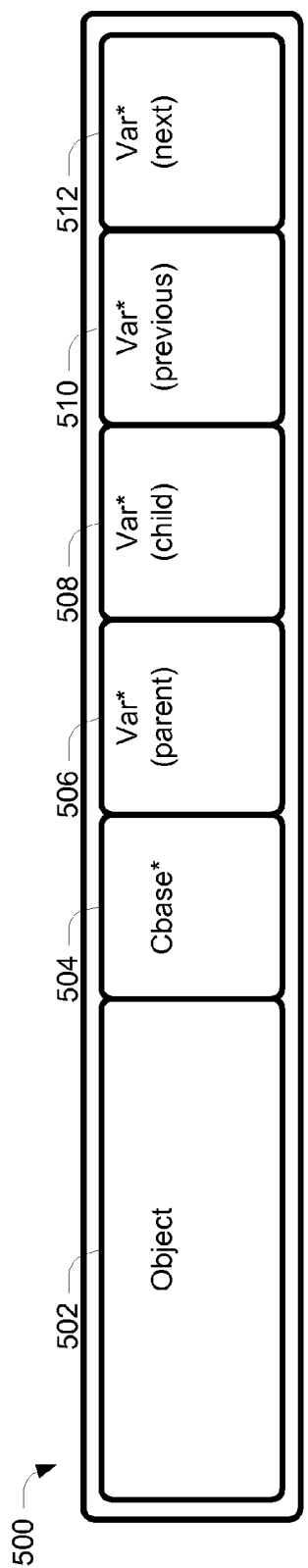
FIG. 5 illustrates an example data structure in accordance with one or more embodiments.

As an example, consider FIG. 5, which illustrates an example CustomExternalObject 500 in accordance with one or more embodiments. CustomExternalObject 500 includes an object 502, which represents the scripting language object, or var, being created. In some embodiments, the scripting language object is associated with a dual nature object. In addition to object 502, CustomExternalObject includes a number of pointers, e.g. five pointers: CBase pointer 504, parent var pointer 506, child var pointer 508, previous var pointer 510, and next var pointer 512. Through the use of the pointers contained within the CustomExternalObject, relationships between two or more objects can be managed.

More specifically, in this particular example, CBase pointer 504 is a code pointer that points back to a layout engine object associated with a dual nature object. This pointer enables access between the scripting engine and layout engine identities of the dual nature object. Parent var pointer 506 is a relationship pointer configured to point to a parent var object of object 502. Similarly, child var pointer 508 is a relationship pointer configured to point to a child var object of object 502. Previous var pointer 510 and next var pointer 512 are additional relationship pointers that are configured to point to siblings of object 502, such as, for example, one of five attributes of a parent. Through the use of the relationship pointers, object relationships are exposed to the garbage collector. This not only enables the garbage collector to more accurately manage the lifespan of an object, but to do so without requiring any of the objects to be pinned.

Figure 6:
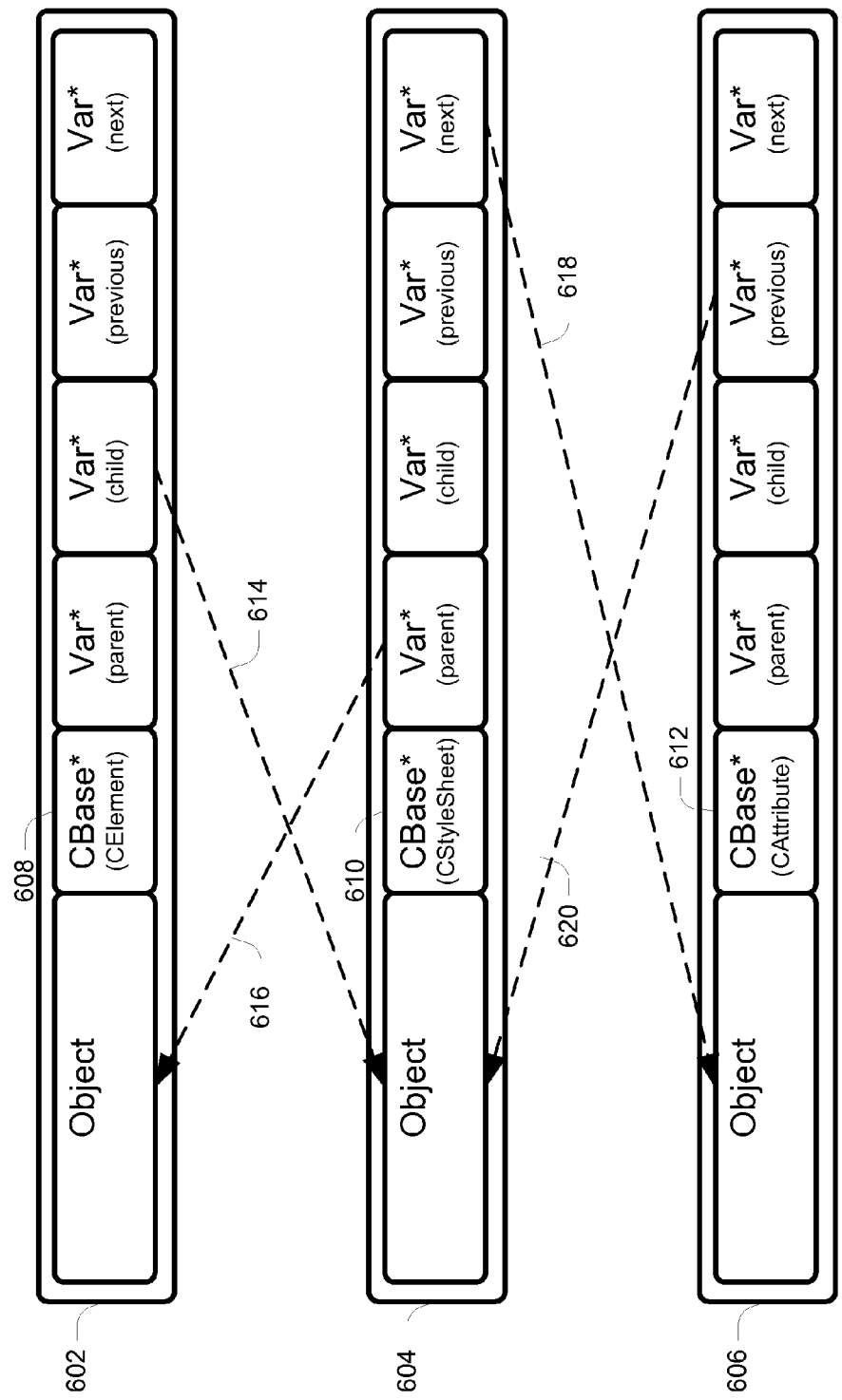
FIG. 6 illustrates example data structures in accordance with one or more embodiments.

Consider now FIG. 6, which illustrates how the relationship pointers contained within an expanded CustomExternalObject can be employed in accordance with one or more embodiments.

FIG. 6 illustrates three CustomExternalObjects—CustomExternalObjects 602, 604, and 606, each of which represent var objects created via a scripting engine. Each CustomExternalObject is associated with a corresponding dual nature object. In this particular example, CustomExternalObjects 602, 604 and 606 are associated with objects that have been created via a layout engine. For instance, CBase pointer 608 contains a pointer back to an object in the layout engine that is of type CElement; CBase pointer 610 contains a pointer back to an object of type CStyleSheet; and CBase pointer 612 contains a pointer back to an object of type CAttribute.

Relationships between the layout engine objects, and their associated CustomExteralObjects 602, 604, and 606, can be expressed in the scripting engine memory space through the use of the additional relationship pointers described above. For example, CustomExternalObject 604 is a child of CustomExternalObject 602, which is expressed through linkage 614 that points the child var pointer of CustomExternalObject 602 to CustomExternalObject 604, and through linkage 616, which points the parent var pointer of CustomExternalObject 604 to CustomExternalObject 602. Alternately or additionally, sibling relationships of objects can be expressed and/or exposed, as illustrated through linkages 618, 620. In this particular example, CustomExternalObject 604 is not only a child object of CustomExternalObject 602, but it is also a sibling of CustomExternalObject 606. As such, the next var pointer of CustomExternalObject 604 points to its next sibling, CustomExternalObject 606, as illustrated with link 618. Additionally, CustomExternalObject 606 points to its previous sibling, CustomExternalObject 604, as further illustrated with link 620. Through the use of this multi-dimensional, doubly-linked list, objects can be exposed to the scripting engine memory manager without requiring all of the objects to be pinned. In some embodiments, a head or main object can be pinned in memory to anchor the main object from unintended destruction and/or recycling from the memory manager.

Additional objects can be rooted to the main object, such as through the doubly-linked list, thus enforcing some protection against the objects being prematurely recycled. For example, when an object is created, it can call a function to determine whether it should be pinned in memory, or rooted to another object. If it is determined that the object should be rooted to an object, the associated relationship pointers can be set accordingly, such as through functions that setup parent/child relationships between objects, or functions that setup sibling relationships between objects.

In some embodiments, the layout engine can create a CustomExternalObject and pass the object to the scripting engine. For example, the layout engine can support an API configured to be callable by the scripting engine. Through execution of API calls, the layout engine can create at least one CustomExternalObject that is native to the scripting engine memory space, include in the CustomExternalObject(s) information that enables the scripting engine to access the layout engine, and return the CustomExternalObject(s) to the calling scripting engine. Alternately or additionally, APIs can be configured to support an ability for elements and/or objects to be inserted into and/or removed from the doubly-linked list supported within a CustomExternalObject.

Figure 7:
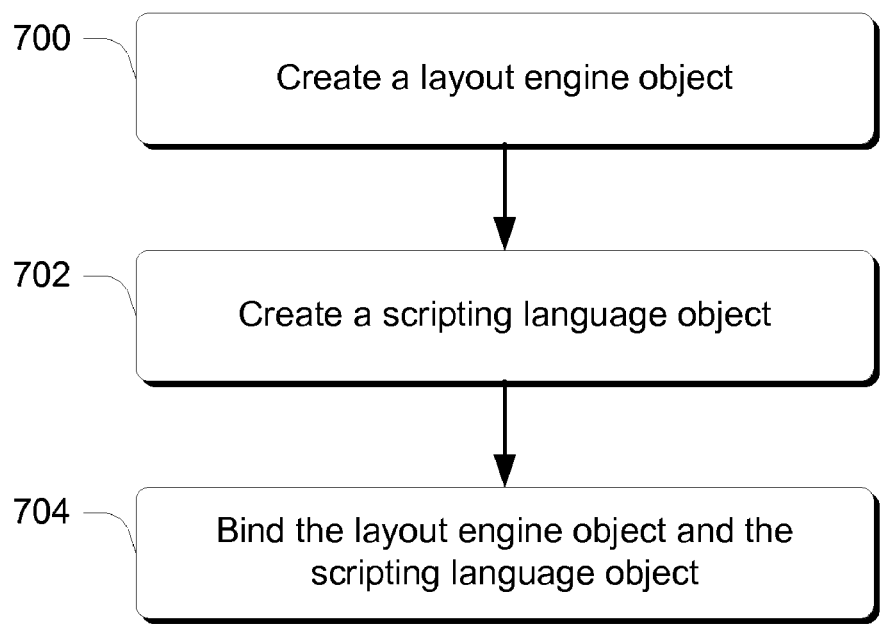
FIG. 7 is a flow diagram that describes steps in a method in accordance with one or more embodiments.

FIG. 7 is a flow diagram that describes steps in a method in accordance with one or more embodiments. The method can be performed by any suitable hardware, software, firmware, or combination thereof. In at least some embodiments, aspects of the method are performed by suitably configured object integration and memory model software executing on a computing device such as browser 110 and/or layout engine 112 of FIG. 1.

Step 700 creates a layout engine object. The creation of the layout engine object can be performed in any suitable manner, such as through an API call, at startup, through receipt of a message, and/or event, and the like. Alternately or additionally, the layout engine object can be an object created by the layout engine that is independent of the layout engine application, such as a document being rendered by the layout engine, an element of the document, and the like. Step 702 creates a scripting language object. Any suitable object can be created, such as a CustomExternalObject as described above. The scripting language object includes any object native to the scripting engine memory space that is accessible through native methods of the scripting language. Alternately or additionally, an object native to the scripting engine can include any object managed by a memory manager of the scripting engine.

Step 704 binds the layout engine object to the scripting language object. Any suitable method can be utilized, examples of which are provided above and below.

Having considered object integration and a corresponding memory model, consider now a discussion of features that enable direct system integration in accordance with one or more embodiments.

Direct System Integration

In some embodiments, binding between the Web browser's layout engine and the scripting engine can include or otherwise utilize features that enable unified programming access between the layout engine and the scripting engine, such as enabling a programmer to access each side of a dual-nature object in a consolidated manner. The features can enhance memory management, enable direct access between the layout engine and scripting engine, and/or enable mutability of a dual nature object, such as the dual nature objects described above.

Figure 8:
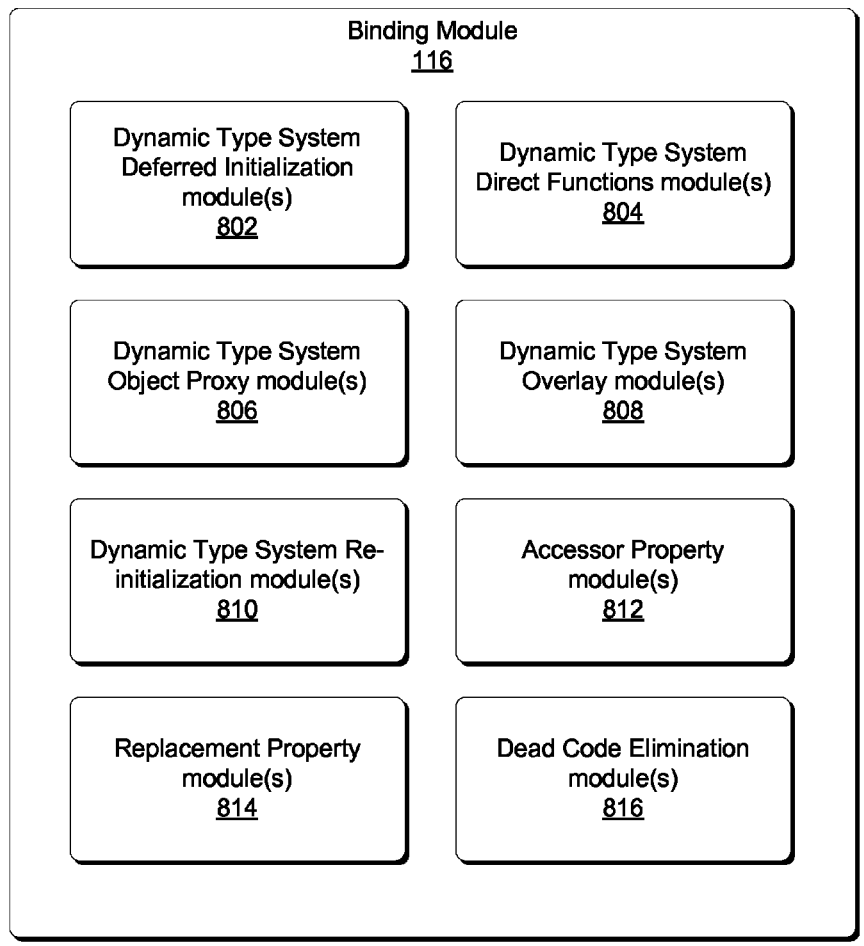
FIG. 8 illustrates an example binding module in accordance with one or more embodiments.

FIG. 8 illustrates, in accordance with one or more embodiments, an expanded view of features included in a binding module, such as, for example, binding module 116 of FIG. 1. In some embodiments, the features described just below can be part of an architecture designed to integrate a layout engine and a scripting engine in a seamless manner. While FIG. 8 illustrates binding module 116 as including a combination of features and/or modules, it is to be appreciated and understood that any combination of features can be included and/or excluded without departing from the claimed subject matter. Moreover, while the illustrated features are shown as separate modules, it is to be appreciated and understood that one or more feature can be implemented as one module, separate modules, or any combination thereof.

Binding module 116 includes, in this particular example, one or more Dynamic Type System Deferred Initialization modules 802, one or more Dynamic Type System Direct Functions modules 804, one or more Dynamic Type System Object Proxy modules 806, one or more Dynamic Type System Overlay modules 808, one or more Dynamic Type System Re-initialization modules 810, one or more Accessor Property modules 812, one or more Replacement Property modules 814, and one or more Dead Code Elimination modules 816, each of which is described below. As a somewhat high level overview of these features, consider the following discussion, which is then followed by a discussion of each feature under its own sub-heading.

In one or more embodiments, Dynamic Type System Deferred Initialization module 802 enables one or more dynamic type system objects to be initialized when requested and/or as needed, as will become apparent below.

In some embodiments, Dynamic Type System Direct Function module 804 can be configured as a redirect structure, such as Trampoline 212 of FIG. 2. Dynamic Type System Direct Function module(s) 804 enable one or more function instance to be built directly into a scripting engine as a native object. Alternately or additionally, Dynamic Type System Direct Function module(s) 804 can be configured to generate a call from the native object to a layout engine backing object. A backing object is an object that can implement, enforce, and/or execute requested functionality.

In one or more embodiments, Dynamic Type System Object Proxy module 806 enables a backing object, such as an object in a layout engine, to override or alter the behavior of an associated scripting engine object.

In one or more embodiments, Dynamic Type System Overlay module 808 enables script running in a scripting engine to replace, modify, and/or eliminate an API associated with a corresponding layout engine object, as further described below.

In one or more embodiments, Dynamic Type System Re-initialization module 810 is configured to enable re-initialization of one or more cross-boundary objects, such as, by way of example and not limitation, object(s) that are transferred to a different type system.

In one or more embodiments, Accessor Property module 812 enables getter and setter functionality of a layout engine object to be exposed and integrated with an associated scripting language object in a manner that is native to the scripting language, as further described below. Getter and setter functions can be configured to execute certain functionality when a variable or object is accessed.

In one or more embodiments, Replacement Property module 814 can be configured to enforce a read-only property assignment to an object, such that values associated with the object can be redirected to another associated object.

In one or more embodiments, Dead Code Elimination module 816 is configured to make code execution more efficient. In some embodiments, Dead Code Elimination module 816 can be configured to skip execution of code determined to have no intended recipient, as will be described below.

Having described a high level overview of various features included in binding module 116, consider now a more detailed discussion of each feature.

Dynamic Type System Deferred Initialization

Some initialization systems can include a number of objects, e.g., 500 objects and even more functions, e.g. 3000 functions. In some approaches, the entire dynamic type system can be loaded, up front, in the scripting engine. Needless to say, the time taken to do so can take a significant amount of startup time. This time can be compounded when, for example, a Web page has many frames (e.g., for ads and the like) and each frame has to load the dynamic type system. In one or more embodiments, a "deferred" type system initialization can be utilized to build the dynamic type system in an "on demand" fashion. Doing so can mitigate in the time impact of loading and entire dynamic type system upfront. Thus, when no DOM APIs are utilized, very little type system initialization cost is incurred. As each new type is needed by, for example, a return value, the approaches described below can create the type and its dependent types and functions just before they are needed. This can amortize the initialization cost of used DOM types, and can eliminate the costs entirely for unused types.

In some embodiments, one or more types in a type system can be initialized in a cascaded, as-needed manner. For example, a particular type in the type system can be initialized in multiple stages such that the particular type becomes accessible and substantiated in the type system after all stages have completed. Information concerning the types in the type system can be initially exposed, declared, or have an associated identifier such that the type system is aware of the types. However, full initialization of the type(s) can be staggered and/or deferred, until the type(s) is/are to be accessed. Alternately or additionally, if a type does not get accessed, it does not become fully substantiated, thus reducing the number of objects created in memory. For example, deferring initialization can reserve memory usage for only those objects being actively used.

In one or more embodiments, a base set of information associated with at least one type can be exposed in a type system to a script and/or scripting engine. The base set of information can be associated with any sort of type, such as, by way of example and not limitation, an object, method, property, prototype, and the like. In some embodiments, the base set of information comprises constructors associated with the type(s). Based upon the information, the script and/or scripting engine can inspect the various types that are available for access. In some embodiments, the script and/or scripting engine can inspect the various types without dynamically querying and/or binding to the types. For example, the various types can initially be exposed in the type system at startup. Runtime performance can improve by reducing or eliminating the need for queries, which can be a time consuming operation. Instead, the script and/or scripting engine can have knowledge of the various types through the initial information, and access the types accordingly without further steps in the script.

Upon accessing a type associated with the base set of information, constructors of the type can be configured to point and/or link to associated prototype information. In some embodiments, the constructors can be configured to point to parent, sibling, and/or child associations. Alternately or additionally, requesting a particular type or prototype can further enable associated prototypes, such as parent or super-prototypes of the particular type, to become available for access. Linking prototype information of associated types can enable a series of relationships between a set of objects and/or prototypes, thus further reducing redundant code between the object(s).

Responsive to pointing and/or linking one or more particular prototype, constant properties and/or methods of the particular prototype(s) can be initialized. For example, the properties and/or methods can be created in memory and initialized with default values. Alternately or additionally, the initialized properties and/or methods can be attached to the particular prototype(s).

Responsive to initializing the properties and/or methods, an instance type operation is created and tied to an associated object in the layout engine. For example, the instance type operation can be configured to create a var object in the scripting engine environment and bind the var object to its associated layout engine object, examples of which are provided above and below.

Figure 9:
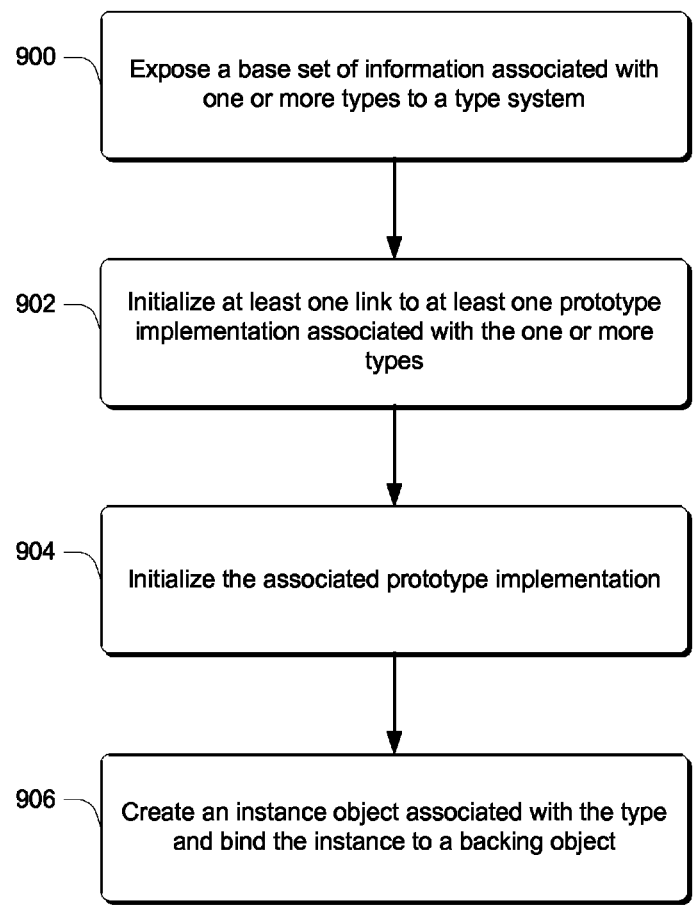
FIG. 9 is a flow diagram that describes steps in a method in accordance with one or more embodiments.

As an example, consider FIG. 9, which illustrates a flow diagram that describes steps in a method in accordance with one or more embodiments. The method can be performed by any suitable hardware, software, firmware, or combination thereof In at least some embodiments, aspects of the method are performed by software, such as a suitably-configured binding module, executing on a client device.

Step 900 exposes a base set of information associated with one or more types to a type system. For example, the base set of information can include one or more constructors associated with the type(s). In some embodiments, the base set of information can be exposed to the type system statically at startup.

Responsive to access to the base set of information, step 902 initializes at least one link to at least one prototype implementation associated with the one or more types. For example, a constructor can be configured to point to an associated prototype implementation. Accessing the constructor can cause the link to the associated prototype implementation to be initialized.

Step 904 initializes the associated prototype implementation and, in some embodiments, the initialized prototype implementation can be attached to the type being initialized.

Step 906 creates an instance object associated with the initialized type, and further binds the instance to a backing object, such as an object in a layout engine. In some embodiments, the instance object can reside in a scripting engine's memory space, while the backing object resides in the layout engine, as described above.

Deferring and/or cascading initialization of types in a dynamic type system as described above enables the types to be built when accessed in an efficient manner, in addition to reserving memory for objects being actively utilized. Having considered Dynamic Type System Deferred Initialization, consider now a discussion of Dynamic Type System Direct Functions.

Dynamic Type System Direct Functions

In some systems, functions were previously treated as host objects and were queried using a particular interface in a two-step process. First, the name of the function was queried to retrieve an ID, and then with the ID, the function was invoked. This two-step process was found to be very costly and inefficient, especially when it was used repeatedly.

In one or more embodiments, this two-step process can be eliminated entirely for objects in the dynamic type system. Objects can be built directly as native scripting engine (e.g., JavaScript objects) and can be accessed using an associated internal lookup process. Function instances can also be built directly into the scripting engine and are looked up using the same process. When the direct function is obtained, for example using the scripting engine lookup process, its invocation generates a call to the DOM's trampoline. The trampoline is able to perform caller validation to take parameters that are passed in and the invoking object(s) to ensure that only objects of the correct type can perform the invocation. In one or more embodiments, this can be done by casting to a base object, retrieving the object's type ID information, comparing against a set of allowed type IDs.

More specifically, in some embodiments, a bridge function, also known as a direct function or a "trampoline" as mentioned above, can be created to bridge calls between the scripting engine and the layout engine. A scripting language function can wrap the bridge function such that the scripting engine can look-up and access the bridge function through methods used to access objects native to the scripting engine (e.g., through its internal look up process mentioned above). The bridge function can be further configured to marshal incoming parameters to an associated layout engine object and call into one or more methods of the associated layout engine object. Alternately or additionally, the bridge function can be further configured to enable validation of callers of the function, such as validation of the callers being of the correct calling type, as mentioned above.

Objects built directly into and/or via the scripting engine can be accessed by the scripting engine using native methods. For example, an object created via a scripting language can be accessed by the scripting engine using native look-up methods as mentioned above. In some embodiments, a scripting language function can wrap a bridge function, thus enabling the scripting engine to access the bridge function via the wrapped function. Since the wrapped function is native to the scripting language, it can be manipulated by the scripting language and/or scripting engine as other native objects. For example, in some embodiments, the wrapped function can be attached and/or rooted to other objects which, in turn, can attach the associated functionality to the other objects.

Figure 10:
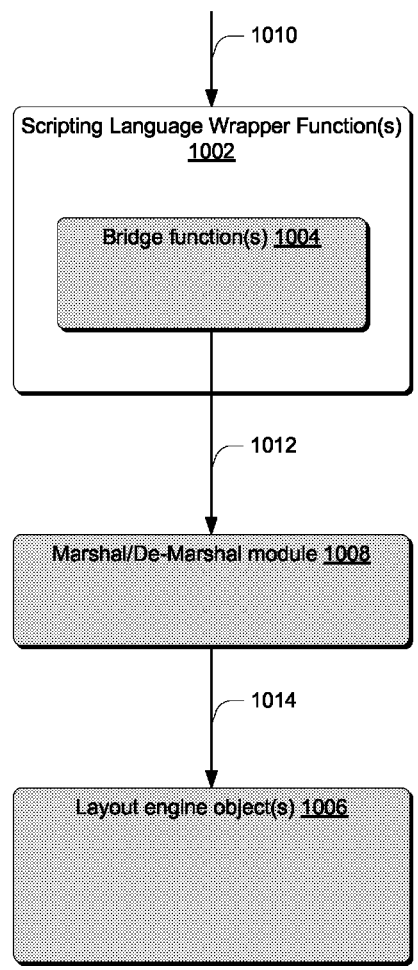
FIG. 10 illustrates a relationship diagram in accordance with one or more embodiments.

As an example, consider FIG. 10, which illustrates various relationships, associated with a bridge function, in accordance with one or more embodiments. White boxes represent functionality implemented in a scripting language, while grey boxes represent functionality implemented outside of the scripting language, for example, in C++. FIG. 10 includes one or more scripting language wrapper functions 1002, one or more bridge functions 1004, one or more layout engine objects 1006 and one or more Marshal/De-Marshal modules 1008. Additionally, FIG. 10 includes flows 1010, 1012 and 1014, which represent one or more calls into Scripting Language Wrapper function 1002, into Marshal/De-Marshal module 1008, and Layout Engine object(s) 1006, respectively. While the arrows are illustrated as a one-way arrow for simplicity of description, it is to be appreciated that the flow of function calls can be two-way without departing from the scope of the claimed subject matter.

Scripting language wrapper function 1002 represents a scripting language function that wraps bridge function 1004. Scripting language wrapper function 1002 is native to the scripting language, thus allowing the scripting language to call and manipulate the function using standard procedures, such as those described above. Scripting language wrapper function 1002 includes information that enables the wrapper function to call into bridge function 1004.

Among other things, bridge function 1004 can be configured perform various forms of validation. For example, in some embodiments, bridge function 1004 can be configured to perform caller validation. Caller validation ensures that only objects of the correct calling type are calling the function. This can be achieved in many ways, such as by utilizing object type identification (ID) information. In some embodiments, as noted above, an object can be cast to a base object, and its associated ID information can be compared against a set of allowed type IDs. The set of allowed type IDs can also be configured to reflect allowed types included in one or more hierarchical relationships. Alternately or additionally, bridge function 1004 can be configured to validate one or more parameters being passed into the function.

Bridge function(s) 1004 can also be configured to direct calls into one or more associated layout engine objects. In some embodiments, bridge function 1004 can direct a call to an associated layout object after validation has been performed and/or passed, examples of which are provided above. Furthermore, the call to an associated layout object can be directed through any suitable method, such as through one or more APIs of the layout object. Parameters can be passed by bridge function 1004 through the use of marshal/de-marshal module 1008. Marshal/de-marshal module 1008 represents functionality that enables objects and/or data to be transferred from one program to another, such as from a scripting engine to a layout engine.

Layout engine object 1006 represents any sort of object, function, and the like, associated with a layout engine. For example, layout engine object 1006 could be a document rendered by a layout engine, an element within the document, and the like. Layout engine object 1006 includes externally exposed methods, functions, and other forms of access that enable objects external to layout engine object 1006 to request functionality from the layout engine object, as well as exchange data. In some embodiments, data can be exchanged through the use of marshal/de-marshal module 1008.

Flows 1010, 1012, and 1014 represent one example of how the various functions and/or modules can interact. Flow 1010 represents a call from a scripting engine to scripting language wrapper function 1002. As discussed above, the scripting engine can call scripting language wrapper function 1002 in any manner native to the scripting engine. Upon getting called, as shown by flow 1010, scripting language engine wrapper function 1002 calls into bridge function 1004. Upon determining parameters need to be passed, in some embodiments, bridge function 1002 can utilize or call marshal/de-marshal module 1008, as illustrated by flow 1012. Marshal/de-marshal module 1008, in response, can pass the parameters into layout engine object 1006, as illustrated by flow 1014. Alternately or additionally, bridge function 1004 can have direct access into layout engine 1006 via APIs, which is not illustrated in FIG. 10.

Bridge functions in combination with scripting language wrapper functions facilitate efficient access between a layout engine and a scripting engine. Additionally, the combination further enables objects to be requested in a manner native to scripting engine, but validated via the layout engine, as discussed above. Having described Dynamic Type System Direct Functions, consider now a discussion of Dynamic Type System Object Proxies.

Dynamic Type System Object Proxies

Some DOM objects have special capabilities beyond those available to native scripting engine objects. For example, if a DOM supports a type of "dynamic array" whose contents change and update as page elements are added and/or removed, by moving DOM objects into the scripting engine via the dynamic type system, these extra capabilities are not provided natively by the scripting engine. In order to facilitate these features via the scripting engine objects, e.g., JavaScript objects, a proxy wrapper known as the "type operations" is provided to all objects.

Thus, various embodiments enable a layout engine object to override capabilities of an associated scripting engine object. In one or more embodiments, the proxy wrapper can be provided to the scripting engine object such that generic or native scripting language operations can be associated with and/or applied to the scripting engine object. In some embodiments, the proxy wrapper can be modified by the layout engine object to include additional and/or alternate behavior.

As discussed above, a dual nature object can comprise a scripting language object and a layout engine object. The scripting language object can be embodied as any type of object native to the scripting language, such as an object, function, and/or prototype that can be created in the scripting language memory space. Similarly, the layout engine object can be embodied as any type of object generated in and/or by the layout engine in the layout engine memory space, examples of which are provided above. In some embodiments, the layout engine object can alter properties, functions, and/or behavior associated with the scripting language object. For example, type operations associated with the scripting language object can execute native behavior of the scripting language. In some cases, the native behavior of the scripting language may be different or out of sync with behavior that is native to the associated layout engine. For instance, some features or extra capabilities, as noted above, supported by layout engine may not have comparable native support in the scripting language. The layout engine object can alter a type operation of the scripting language object to include additional and/or completely different behavior when called. Any suitable type of alteration can be included, such as an ability to support a dynamic array as mentioned above, where contents of the array can be updated, added, and/or removed. Further examples include using type operations to provide overrides for getting and setting properties, property detection, as well as control over when the type operations should be used, e.g. during the JavaScript lookup operation process or after it fails to locate a property via the same process. Through these alterations, the layout engine object can modify or add behavior to the scripting language object to mimic its own native behavior.

Figure 11:
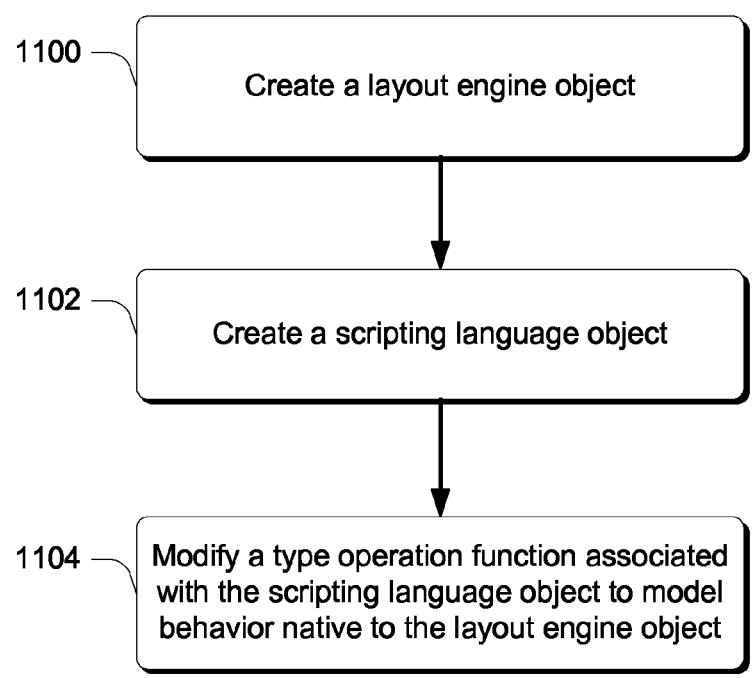
FIG. 11 is a flow diagram that describes steps in a method in accordance with one or more embodiments.

Consider FIG. 11, which illustrates a flow diagram that describes steps in a method in accordance with one or more embodiments. The method can be performed by any suitable hardware, software, firmware, or combination thereof In at least some embodiments, aspects of the method are performed by suitably configured software executing on a computing device such as binding module 116, layout engine 112, and/or scripting engine 118 of FIG. 1.

Step 1100 creates a layout engine object. The creation of the layout engine object can be performed in any suitable manner. Any suitable type of layout engine object can be created, examples of which are provided above. Step 1102 creates a scripting language object, such as an object that is native to a scripting engine memory space. Step 1104 modifies a type operation associated with the scripting language object to model behavior native to the layout engine object, examples of which are provided above and below.

Having described dynamic type system object proxies, consider now a discussion of dynamic type system overlay.

Dynamic Type System Overlay

APIs in the dynamic type system are mutable versus the legacy-type system which was static and could only be altered in very limited ways. Thus, JavaScript programs can replace "built-in" DOM APIs with their own, cache and call the APIs, or even delete the APIs outright. In these instances, this only affects the direct function entry points and not the static DOM which supports the code behind them.

In one or more embodiments, the mutability (or lack thereof) is controlled via individual property's property descriptor. Property descriptors have meta-information that is consumable by the scripting engine, e.g., the JavaScript engine. Property descriptors provide control enumerability, configurability (e.g., whether an API can be changed or deleted), and a write-ability (e.g., whether data properties or fields can have their values changed).

In one or more embodiments, once the APIs have been initialized into the scripting engine, e.g., JavaScript engine, built-in scripting engine APIs work on associated objects as if they are native objects. For example, an operator known as "instanceof" checks whether a given instance is a member of a given type. The JavaScript implementation can query an instance's type, and traverse an associated property's type chain comparing the right-argument to the operator against each DOM type's prototype object. In one or more embodiments, property descriptors are accessed and modified via the same JavaScript native APIs as any other JavaScript object. In this manner, the JavaScript program can dynamically modify the DOM APIs without affecting the static DOM code. This integration allows greater integration and seamless behavior with less complication in overhead.

Figure 12:
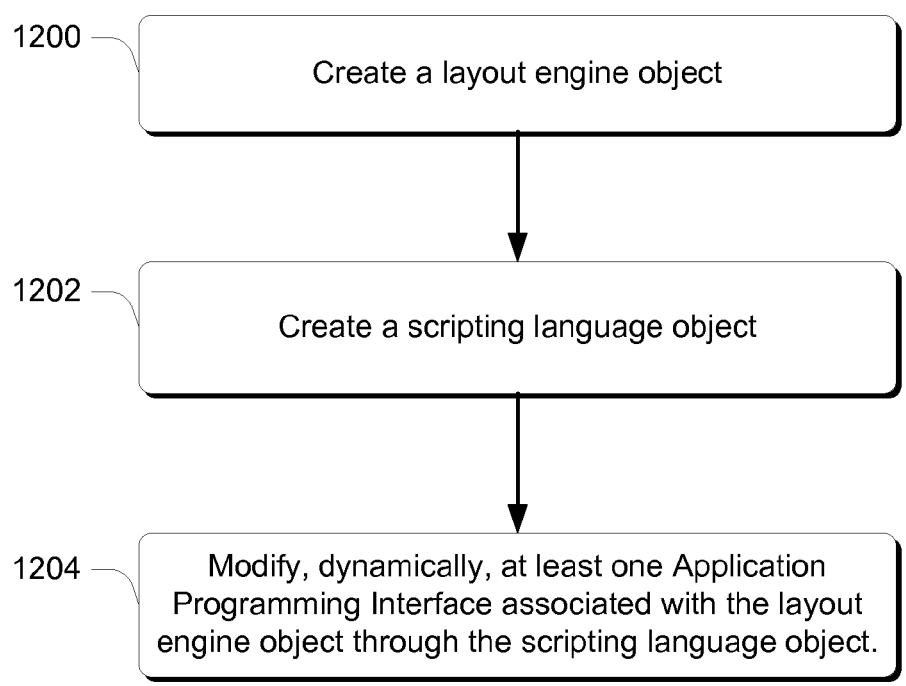
FIG. 12 is a flow diagram that describes steps in a method in accordance with one or more embodiments.

Consider FIG. 12, which illustrates a flow diagram that describes steps in a method in accordance with one or more embodiments. The method can be performed by any suitable hardware, software, firmware, or combination thereof. In at least some embodiments, aspects of the method are performed by suitably configured software executing on a computing device such as binding module 116, layout engine 112, and/or scripting engine 118 of FIG. 1.

Step 1200 creates a layout engine object. The creation of the layout engine object can be performed in any suitable manner. Any suitable type of layout engine object can be created, examples of which are provided above. Step 1202 creates a scripting language object, such as an object that is native to a scripting engine memory space. Step 1204 modifies, dynamically, at least one API associated with the layout engine object through the scripting language object, examples of which are provided above and below.

Having described dynamic type system overlay, consider now a discussion of dynamic type system re-initialization.

Dynamic Type System Re-Initialization

Various embodiments enable an object native to a scripting engine environment to be transferred to a second scripting engine and/or type system. Such can mitigate security scenarios where, for example, an object's type can provide an inadvertent leak of information. In at least some embodiments, information associated with at least one property and/or prototype of the object can be transferred to the second scripting engine and/or type system. In some embodiments, an object that has changed from an initial state can be transferred with its state changes intact.

In operation, an object can be created that is native to a scripting language environment. Such can occur, for example, by a scripting engine running a script, through the layout engine returning a native scripting language object to the scripting engine, and the like. At times, the layout engine may desire to have an object that is native to the first scripting engine transferred or re-initialized to another scripting engine. For example, in some instances, the layout engine may desire a scripting language object that has a dual nature, as described above, to be transferred to a second scripting engine. To do so, attributes of the first scripting engine object can be copied and/or translated to a second scripting engine object, thus effectively transferring or re-initializing the first scripting engine object to the second scripting engine. In this way, bindings between a dual nature object can be preserved when transferring between multiple scripting engines. Additionally, in some embodiments, the first scripting language object can be removed or deleted without affecting the second scripting language object.

Additionally, the scripting language can enable properties of the object to be dynamically changed, such as prototypes, functions, inheritance and/or property chain, and the like. For example, default values, default properties, default inheritance chains, and the like can be dynamically altered over time. In some embodiments, the altered properties of an object in the first scripting engine can be transferred to the corresponding object in the second scripting engine, such as by copying them. In this manner, static and dynamic changes associated with scripting objects can be preserved across several boundaries.

Figure 13:
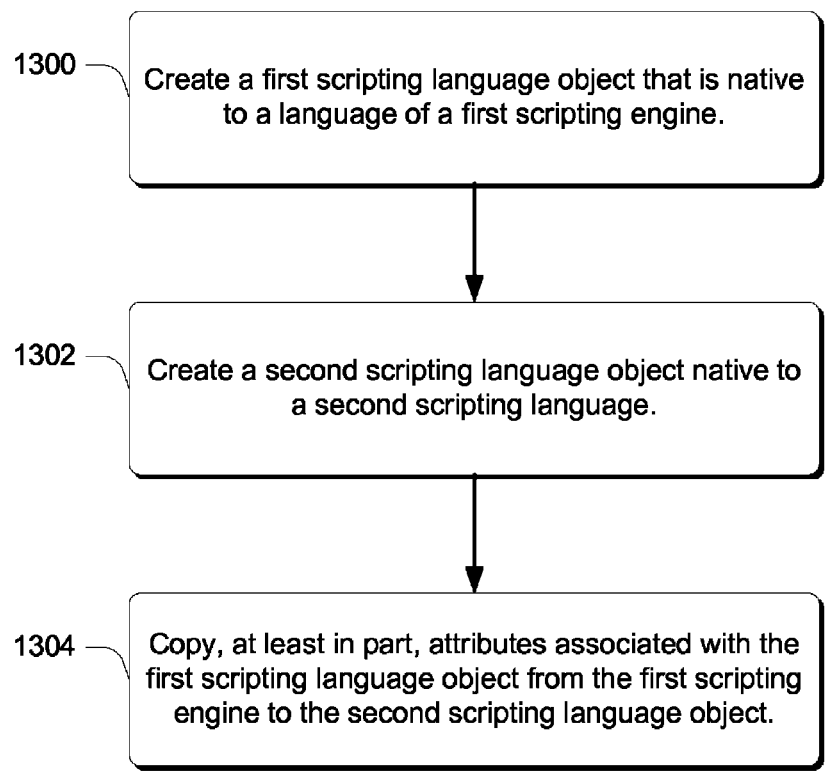
FIG. 13 is a flow diagram that describes steps in a method in accordance with one or more embodiments.

Consider FIG. 13, which illustrates a flow diagram that describes steps in a method in accordance with one or more embodiments. The method can be performed by any suitable hardware, software, firmware, or combination thereof. In at least some embodiments, aspects of the method are performed by suitably configured software executing on a computing device such as binding module 116, layout engine 112, and/or scripting engine 118 of FIG. 1.

Step 1300 creates a first scripting language object that is native to a language of a first scripting engine. The creation of the first scripting language object can be performed in any suitable manner. Alternately or additionally, any suitable type of scripting language object can be created, examples of which are provided above. Step 1302 creates a second scripting language object that is native to a language of a second scripting language. In some embodiments, the first and second scripting languages are not the same language. In other embodiments, the first and second scripting languages are the same. Step 1304 copies, at least in part, attributes associated with the first scripting language object from the first scripting engine to the second scripting language object. Any suitable attribute can be copied, such as a pointer, a value, a data structure, and the like. In some embodiments, bindings included in the first scripting language object can be copied to the second scripting language object. Alternately or additionally, a translation and/or transformation can be applied to an attribute to confirm to the second scripting language.

Accordingly, scripting language objects can be transferred across boundaries of multiple scripting engines and/or type systems while preserving properties of the objects, such as inheritance, prototypes, and the like. Having described dynamic type system re-initialization, consider now a discussion of accessor properties.

Accessor Properties

Various embodiments enable direct access to getter and setter accessors of a dual nature object. Getter accessors can be called separately from setter accessors using unique signatures for each.

Accessors enable access to a property, variable, and/or value without direct exposure of an associated object. For example, a script can set a value or property of an object by calling a setter accessor, without the script having direct access to the associated object or variable storing the value and/or property. Similarly, the script can get a value or property by calling a getter accessor. In some embodiments, getter and setter functionality of the layout engine object can be exposed and integrated with an associated scripting language object in a manner that is native to the scripting language. For example, direct functions can be used to integrate accessors associated with the layout engine object into the scripting engine.

In some embodiments, each accessor can have a unique signature. For example, different direct functions can be used for a getter and setter, respectively. This enables a script, object, prototype, and the like, to call each getter and setter uniquely. Thus, direct functions can be used to enable access from a scripting engine to accessors associated with layout engine objects. Through the use of unique direct functions for each setter and getter, setter and getter functions can be called directly instead of passing one or more parameters to a shared function or ID in order to distinguish between the two.

Figure 14:
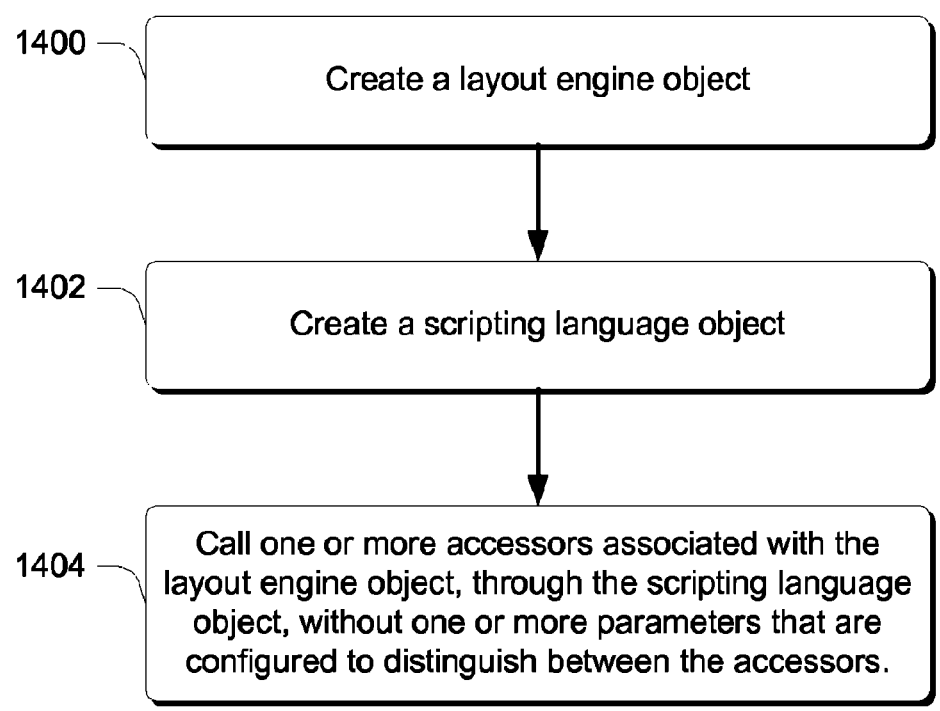
FIG. 14 is a flow diagram that describes steps in a method in accordance with one or more embodiments

Consider FIG. 14, which illustrates a flow diagram that describes steps in a method in accordance with one or more embodiments. The method can be performed by any suitable hardware, software, firmware, or combination thereof. In at least some embodiments, aspects of the method are performed by suitably configured software executing on a computing device such as binding module 116, layout engine 112, and/or scripting engine 118 of FIG. 1.

Step 1400 creates a layout engine object. The creation of the layout engine object can be performed in any suitable manner. Any suitable type of layout engine object can be created, examples of which are provided above. Step 1402 creates a scripting language object, such as an object that is native to a scripting engine memory space. Step 1404 calls one or more accessors associated with the layout engine object, through the scripting engine object, without one or more parameters that are configured to distinguish between the one or more accessors. For example, each accessor can be configured to have a unique signature, as described above.

Having described accessor properties, consider now a discussion of replacement properties.

Replacement Properties

Various embodiments enable a read-only property to be replaceable. Replace-ability pertains to a situation in which a read-only property is changed. Specifically, when a read-only property is assigned a value, the original read-only property is removed and the newly assigned property takes its place. In one or more embodiments, this semantic is supported by assigning a put_accessor value to the read only property. When it is then invoked, an associated interface is used to create a new property on the calling instance object that then "shadows" the read-only API. Using this technique, future requests for the read-only properly will correctly obtain the shadowed property instead. Furthermore, if the shadowed property is ever deleted, the original replaceable read-only is once again accessible.

Thus, in some embodiments, a replaceable value can be a shadow value configured to virtually replace the read-only property. Alternately or additionally, a setter accessor associated with the read-only property can be implemented to mimic read-only behavior.

In some embodiments, a read-only property of a layout engine object can be configured to be replaceable in the manner just described. For example, in a dual nature object such as those described above, the scripting language object can be configured to virtually set the replaceable read-only property value on the scripting engine side, without physically replacing the layout engine object value. A shadow value can then be stored as a field on an instance object associated with the scripting language object. When a script or object queries the read-only property, the shadow value can then be returned. In one or more embodiments, deleting the shadow value, as mentioned above, can then restore the read-only property to an original value, such as that of the layout engine object.

Figure 15:
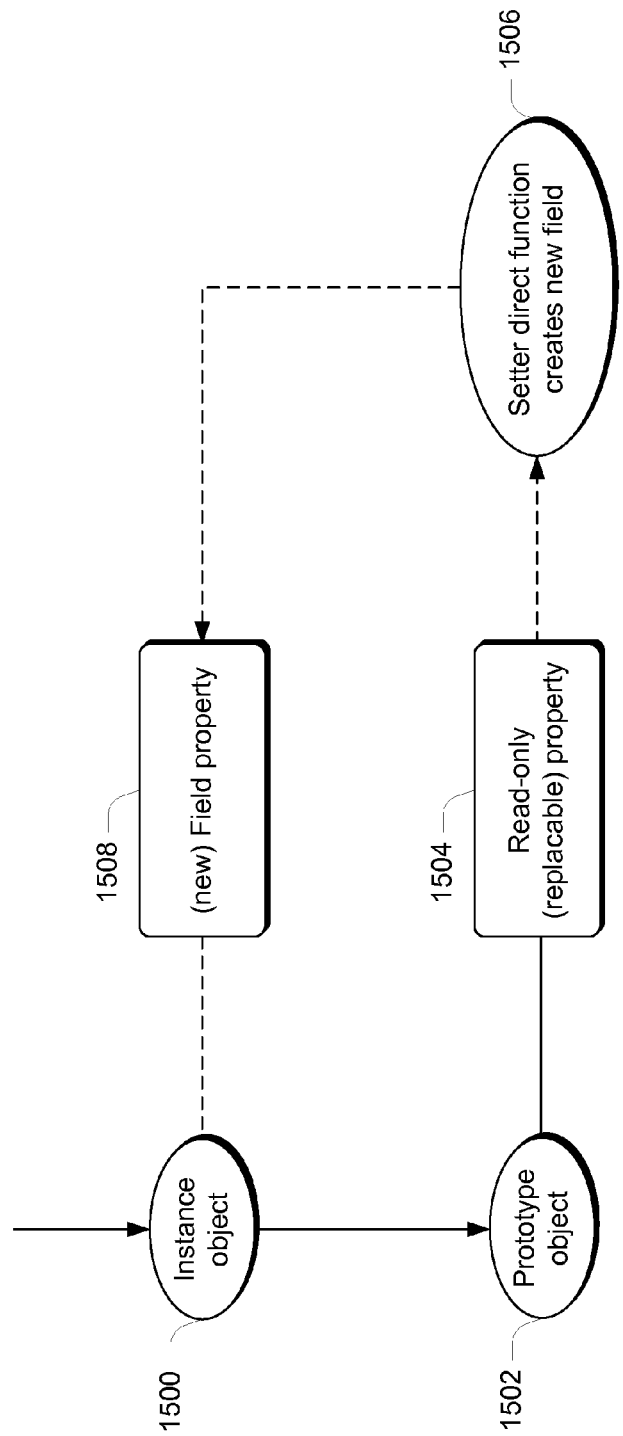
FIG. 15 illustrates a process diagram in accordance with one or more embodiments.

For example, consider FIG. 15, which illustrates a process diagram describing read-only replaceable properties. When attempting to access a read-only replaceable property, the scripting language lookup path begins at instance object 1500. From instance object 1500, the lookup path moves to associated prototype object 1502. In some embodiments, prototype object 1502 can comprise read-only (replaceable) property 1504 which can be an accessor property. Each accessor (e.g. getter and setter) can be configured as a direct function into an associated layout engine object. Further, setter direct function 1506 can be configured to create (new) field property 1508 associated and/or attached to instance object 1500 when invoked with a value. In future calls through the scripting engine lookup path, since instance object 1500 resides first in the path, field property 1508 will be found first and the value returned.

Figure 16:
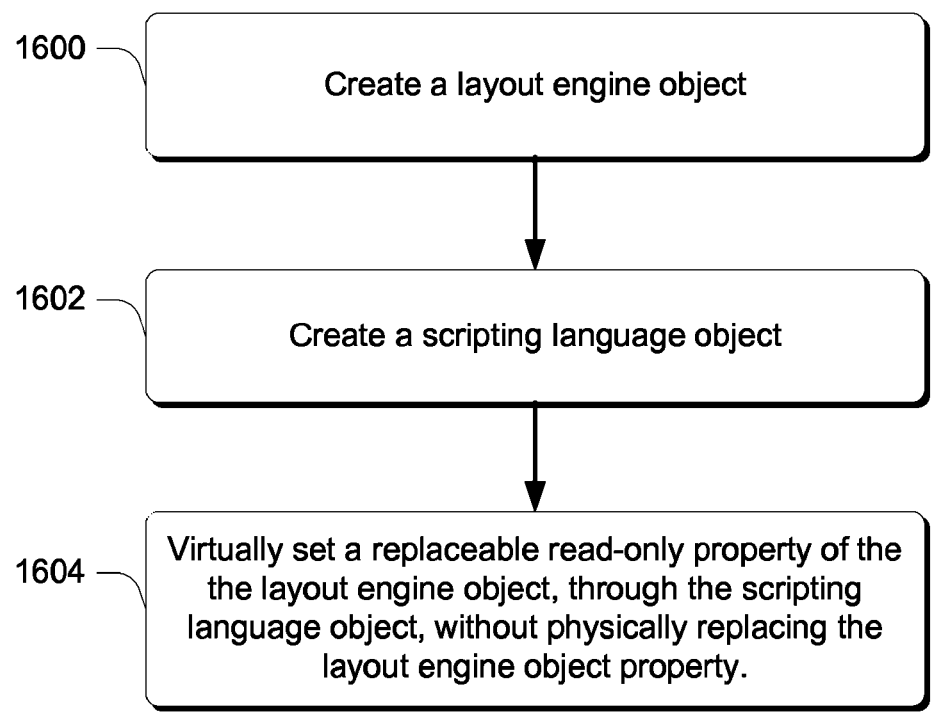
FIG. 16 is a flow diagram that describes steps in a method in accordance with one or more embodiments.

As a further example, consider FIG. 16, which illustrates a flow diagram that describes steps in a method in accordance with one or more embodiments. The method can be performed by any suitable hardware, software, firmware, or combination thereof In at least some embodiments, aspects of the method are performed by suitably configured software executing on a computing device such as binding module 116, layout engine 112, and/or scripting engine 118 of FIG. 1.

Step 1600 creates a layout engine object. The creation of the layout engine object can be performed in any suitable manner. Any suitable type of layout engine object can be created, examples of which are provided above. Step 1602 creates a scripting language object, such as an object that is native to a scripting engine memory space. Step 1604 virtually sets a replaceable read-only property of the layout engine object, through the scripting language object, without physically replacing the layout engine object property, such as through a shadow value as described above.

Having described replacement properties, consider now a discussion of dead code elimination.

Dead Code Elimination

Various embodiments enable an evaluation of code usage and for efficiencies to be enhanced through so-called dead code elimination. In some embodiments, execution of the code can be prevented based upon this evaluation.

In one or more embodiments, code can be evaluated to determine whether its associated output used. For example, in some embodiments, a function and/or prototype can return data such as a value, string, object, and the like, to an intended recipient. Usage of the returned data can be evaluated and, if it is determined that the returned data is not to be used, execution of associated code can be prevented. For example, if there is no such intended recipient for the returned data, code that ordinarily converts the returned data can be skipped thus saving processing time and improving performance. If the returned data does have an intended recipient, then the associated code is allowed to run.

Having discussed dead code elimination, consider now a discussion of a security model in accordance with one or more embodiments.

Security Model

Various embodiments enable secure interactions between scripting engines residing in separate domains. In some cases, protections can be employed to prevent object access and/or restrict access to type system information. Alternately or additionally, in some embodiments, functions that include cross-domain access functionality can be marked as safe, thus allowing cross-domain access. In some embodiments, a sub-window proxy can provide secure access across multiple domains to one or more sub-objects associated with a window.

Figure 17:
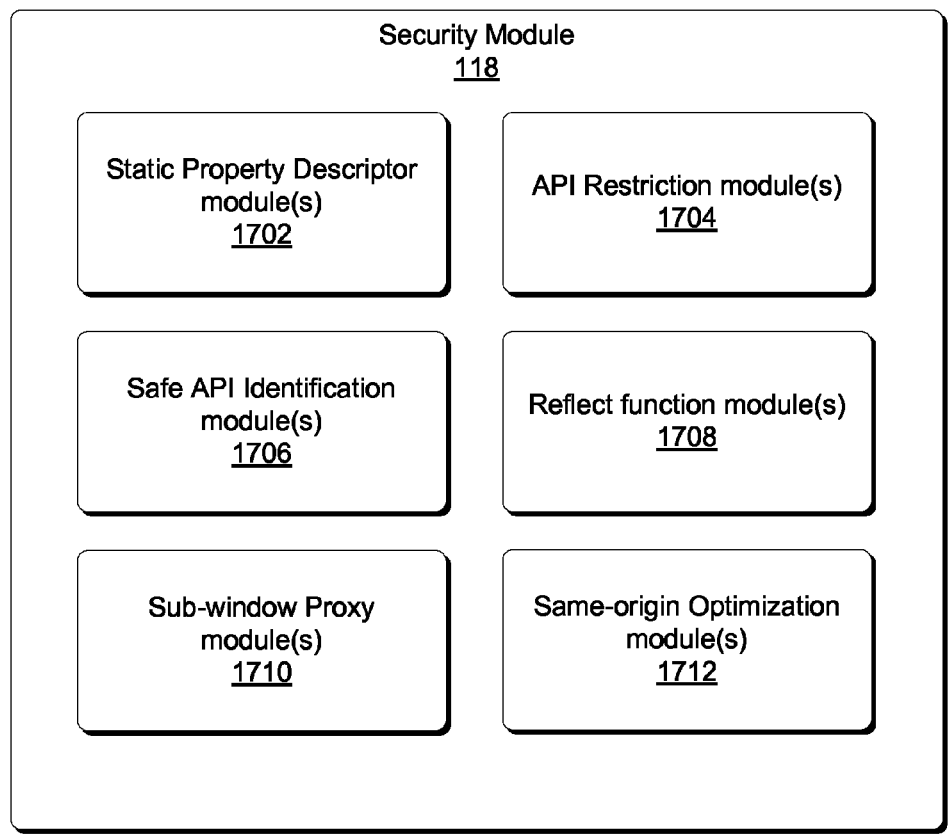
FIG. 17 illustrates an example security module in accordance with one or more embodiments.

As an example, consider FIG. 17, which illustrates an expanded view of features included in a security module, such as, for example, security module 118 of FIG. 1. In some embodiments, the features described below can be part of an architecture designed to enforce security within a layout engine and/or a scripting engine, such as cross-domain security. While FIG. 17 illustrates security module 118 including a combination of features and/or modules, it is to be appreciated and understood that any combination of features can be included and/or excluded without departing from the claimed subject matter. Moreover, while the illustrated features are shown as separate modules, it is to be appreciated and understood that one or more feature can be implemented as one module, separate modules, or any combination thereof.

In the illustrated and described embodiment, security module 118 includes one or more static property descriptor modules 1702, one or more API restriction modules 1704, one or more safe API identification modules 1706, one or more reflect function modules 1708, one or more sub-window proxy modules 1710, and one or more same-origin optimization modules 1712.

In one or more embodiments, static property descriptor module 1702 enables configuration of access to a property descriptor, as will be further discussed below.

In one or more embodiments, API restriction module 1704 enables the ability to block access to internal library APIs of a scripting language. In some embodiments, access to the APIs can be blocked based upon a current state of a caller, such as whether the caller is in a same-domain or a different domain.

In one or more embodiments, safe API identification module 1706 enables the ability to mark one or more APIs as being safe APIs to call. At least some of the marked APIs can be APIs configured to enable cross-domain access.

In one or more embodiments, reflect function module 1708 enables function objects to be exchanged across domains without exposing associated type system information. The exchanged function objects can be configured to be created in a type system associated with a caller, as will become apparent below.

In one or more embodiments, sub-window proxy module 1710 enables an ability to have sub-windows that inherit security properties of a primary window. Security decisions of the sub-window can be proxied and/or deferred to the primary window.

In one or more embodiments, same-origin optimization module 1712 enables same-origin security checks to be bypassed, as will be further described below.

Having described an overview of various features included in security module 118, consider now a more detailed discussion of each feature under its own respective sub-heading.

Static Property Descriptor Module(s)

Various embodiments enable an ability to configure access to a property descriptor. For example, individual attributes associated with a property descriptor can be configured to allow and/or disallow certain forms of access to the property descriptor. For example, a property descriptor can be configured to be visible, not visible, writable, mutable, un-mutable, configurable, and the like. In a dynamic type system, when a property descriptor is marked as un-mutable, it cannot be dynamically changed, effectively making the property descriptor static. Altering the property descriptor's accessibility and/or configurability can restrict access and/or alterations to the property descriptor.

In one or more embodiments, during a definition phase of the property descriptor, tags can be included in the definition to describe various attributes associated with the property descriptor. For instance, meta-data can be included and/or associated with a property descriptor definition to define one or more attributes of the property descriptor, as will be further described below. A scripting engine can then be configured to recognize, support, and/or enforce the attributes as specified.

Utilizing configurable attributes as described above can prevent script from altering property descriptors, thus ensuring a more secure environment. Having described static property descriptors, consider a discussion of API restriction modules.

API Restriction Modules

In one or more embodiments, access to library functions of a scripting language can be altered or restricted to adhere to security policies. For example, access to an API of the scripting language can be conditionally blocked and/or restricted to prevent the API from working in cross-domain conditions. The API can be any form of library function such as, by way of example and not limitation, defineProperty( ), getOwnPropertyDescriptor( ), HasAccessor( ), getPrototypeOf( ), and the like. A type operation of the API can be modified and/or replaced to enforce security policies. For example, when the API is called, the modified type operation can determine whether access is to be granted or not based upon the security policies. In some embodiments, when it is determined to not grant access, access can be disabled and/or an exception can be thrown.

Security policies can include any form of policy, such as a policy that is associated with whether a caller of the library function is in the same domain or not. In some embodiments, when the library function is called across separate domains, access to the function can be blocked.

Restricting access to library functions of a scripting language can prevent unwanted cross-domain access to objects and/or type systems. Having described API restriction modules, consider now a discussion of safe API identification modules.

Safe API Identification Module(s)

Various embodiments enable functions to be configured as so-called safe functions. An API included in a library and/or associated with an object can be marked as "safe", while other associated functions and/or properties are disallowed. In at least some embodiments, functions can be selectively marked as allowable, regardless of what type of information can be accessed via the function. For example, a function that enables cross-domain access can be marked as safe. Being marked as safe allows the function to execute regardless of what state it is being called in, such as across multiple domains. For example, tags and/or attributes can be assigned to an API during its definition phase to mark the API as a safe API, as further described below. In a dual nature object, enforcement of the allowed and/or disallowed API can occur on the layout engine side of the dual nature object.

Having described safe API identification, consider now a discussion of reflect functions.

Reflect Functions

In one or more embodiments, a function object can be returned across one or more domains without divulging type system information associated with the function's origins. The function object can be wrapped with a function and/or associated with a proxy object, where the wrapped function and/or associated proxy object is returned across the multiple domains. In some embodiments, the wrapped function and/or proxy object can be configured to be actualized in the type system of the receiving domain.

In one or more embodiments, cross-domain access to a function object can be allowed without divulging type system information of the function object's origins. For instance, script residing in a first domain can request access to a function object in a second domain. The function object inherently includes type system information associated with its type system of origin. This inherent type system information can be obscured from external domains and/or type systems, such as through the use of a wrapper function and/or proxy object. When a function object is requested across domains, the wrapper function and/or proxy object can be returned instead of the function object. The wrapper function and/or proxy object can be further configured to direct calls to the function object, thus enabling indirect access to the function object. For example, the wrapper function and/or proxy object can allow safe access to all of the associated capabilities of the function object, such as call, apply, bind, constructor, and the like.

In some embodiments, the wrapper function and/or proxy object can direct calls without exposing type system information associated with the function object's origin. For example, the wrapper function and/or proxy object can be configured to instantiate in the type system of the calling type system. By instantiating in the type system of the calling system, attempted access to type system information of the wrapper function and/or proxy object yields type system information of the calling system. The calling system can call the wrapper function and/or proxy object in methods native to the calling system for access to the original function object.

Through the use of wrapper functions and/or proxy objects, function objects can be accessed across multiple domains without exposing any type system information associated with the function objects. Having discussed reflect functions, consider now a discussion of sub-window proxies.

Sub-Window Proxies

In one or more embodiments, one or more sub-window proxies can be associated with a primary type system window proxy. The sub-window proxy can be configured to assert at least some security policies associated with the primary window proxy. Alternately or additionally, the sub-window proxy can exist independent of the primary window proxy.

At times, a window associated with a window proxy can have objects underneath the window that are accessible. The window proxy enables multiple domain access to the associated window. For example, the window proxy can proxy, by way of example and not of limitation, property detection, built-in read/write/execute requests, user-defined property read/write/execute requests, library object access, array index addressing, custom name resolution, enumeration, and the like, to the associated window. In some embodiments, objects underneath the window can be accessed, such as through a sub-window proxy. For instance, an object returned from a safe API as described above can be returned as a sub-window proxy. As in the case of the window proxy, the sub-window proxy can be configured to proxy the capabilities of its corresponding object.

In some embodiments, the sub-window proxy can assert at least the security policies associated with its primary window proxy. For instance, the sub-window proxy can be configured to defer security decisions to its primary window proxy. Alternately or additionally, the sub-window proxy can exist independently of its primary window proxy. In some embodiments, the sub-window proxy can be configured to be dynamically updated to reflect contents of a new window's sub-object.

Accordingly, sub-window proxies can enable cross-domain access to objects that are sub-objects associated with a window, without exposing type system information associated with the sub-objects. Having described sub-window proxies, consider now a discussion of global optimization for same-origin requests.

Global Optimization for Same-Origin Requests

Many websites use self-referential properties to explicitly specify that they are requesting properties from a global namespace root, e.g., "window.document", where "window" is a self-reference to the implicit namespace root object. In one or more embodiments, self-referential properties to a global object, such as a JavaScript global object, return all proxies to that object in order to protect against accidental or willful disclosure of the global object. However, due to the common practice of self-referencing, security checks can degrade performance, even when they are not really necessary. In accordance with one or more embodiments, to increase performance of the property request under these circumstances, the proxy's caller and target can be preemptively checked to see if they are the same object. If so, expensive security checks can be safely bypassed without sacrificing the security of the global object.

As such, various embodiments can enable security checks to be bypassed, such as when a caller and a target are of the same domain and/or origin. If a caller and a target reside in the same domain, then security checks, such as those to protect cross-domain access, can be bypassed.

As an example, consider the following. A secure window object, such as a proxy object, can be utilized and can call into a global object which, in turn, has access to various forms of information and/or code execution, such as a trusted window. Responsive to these calls, a comparison can be made to determine whether a caller of the secure window object and the target of the call, such as the trusted window, reside in the same domain and/or origin. If the caller and the target are determined to reside in the same origin, security checks can be bypassed. In this instance, bypassing the security checks can be done without risk of unintended exposure.

Bypassing security checks on same-origin transactions can enhance runtime performance by preventing unnecessary code from executing. Having described global optimization for same-origin requests, consider now an example method in accordance with one or more embodiments.

Figure 18:
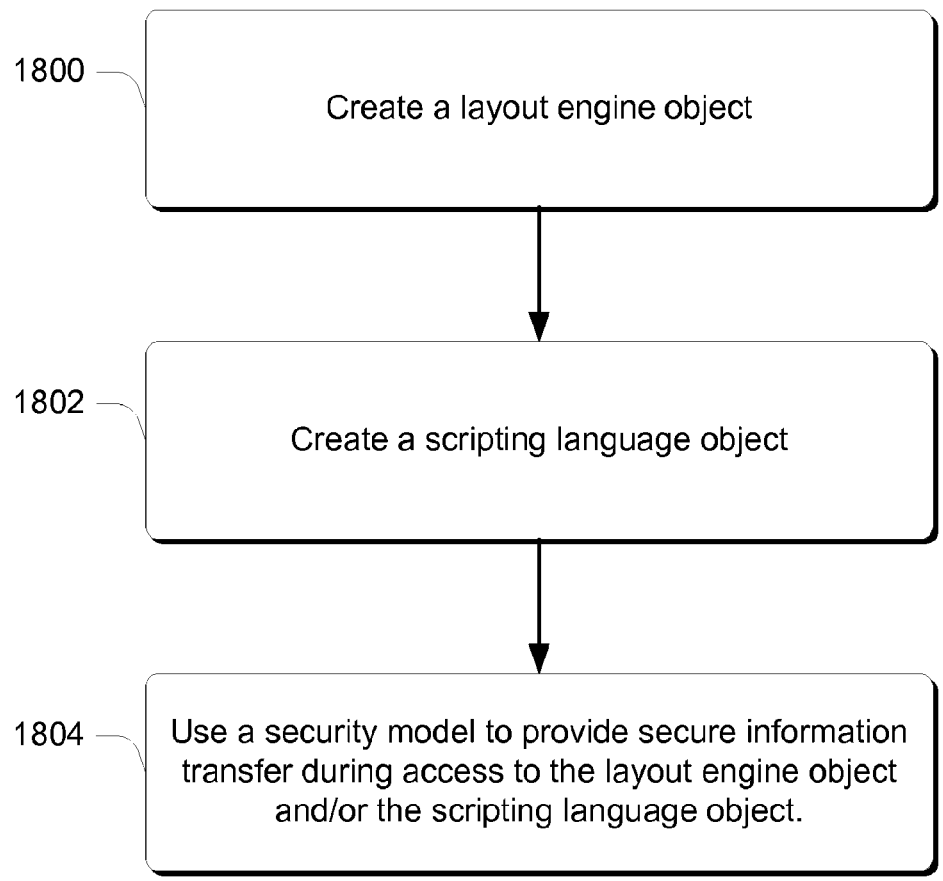
FIG. 18 is a flow diagram that describes steps in a method in accordance with one or more embodiments.

FIG. 18 illustrates a flow diagram that describes steps in a method in accordance with one or more embodiments. The method can be performed by any suitable hardware, software, firmware, or combination thereof. In at least some embodiments, aspects of the method are performed by suitably configured software executing on a computing device such as security module 118, layout engine 112, and/or scripting engine 118 of FIG. 1.

Step 1800 creates a layout engine object. The creation of the layout engine object can be performed in any suitable manner. Any suitable type of layout object can be created, examples of which are provided above. Step 1802 creates a scripting language object, such as an object that is native to a scripting engine memory space. Step 1804 uses a security model to provide secure information transfer during access to the layout engine object and/or the scripting language object, examples of which are provided above.

Having described various security models in accordance with one or more embodiments, consider now a discussion of various aspects of Interface Definition Language (IDL) integration in accordance with one or more embodiments.

Interface Definition Language Integration

In one or more embodiments, extensions to an Interface Definition Language (IDL) can facilitate and enable direct integration of a layout engine and a scripting engine.

In one or more embodiments, extended IDL code can be used in conjunction with an IDL compiler to enable generation of code configured to bridge the layout engine and scripting engine. Alternately or additionally, hierarchical relationships between objects and their associated APIs can be described using the extended IDL. In some embodiments, the extended IDL can include syntax to describe attributes of the objects and/or the associated APIs.

As will be appreciated by the skilled artisan, IDL code can be used to describe one or more interfaces between various software components, such as interfaces between a layout engine and a scripting engine. Extensions to the IDL code, as described herein, can be included to further describe objects, APIs defined on the objects, relationships between the objects, attributes associated with the objects and/or APIs, and the like. A compiler, such as an IDL compiler, can interpret the IDL code and generate corresponding functions, header files, and the like, to enable the software components access to one another.

Figure 19:
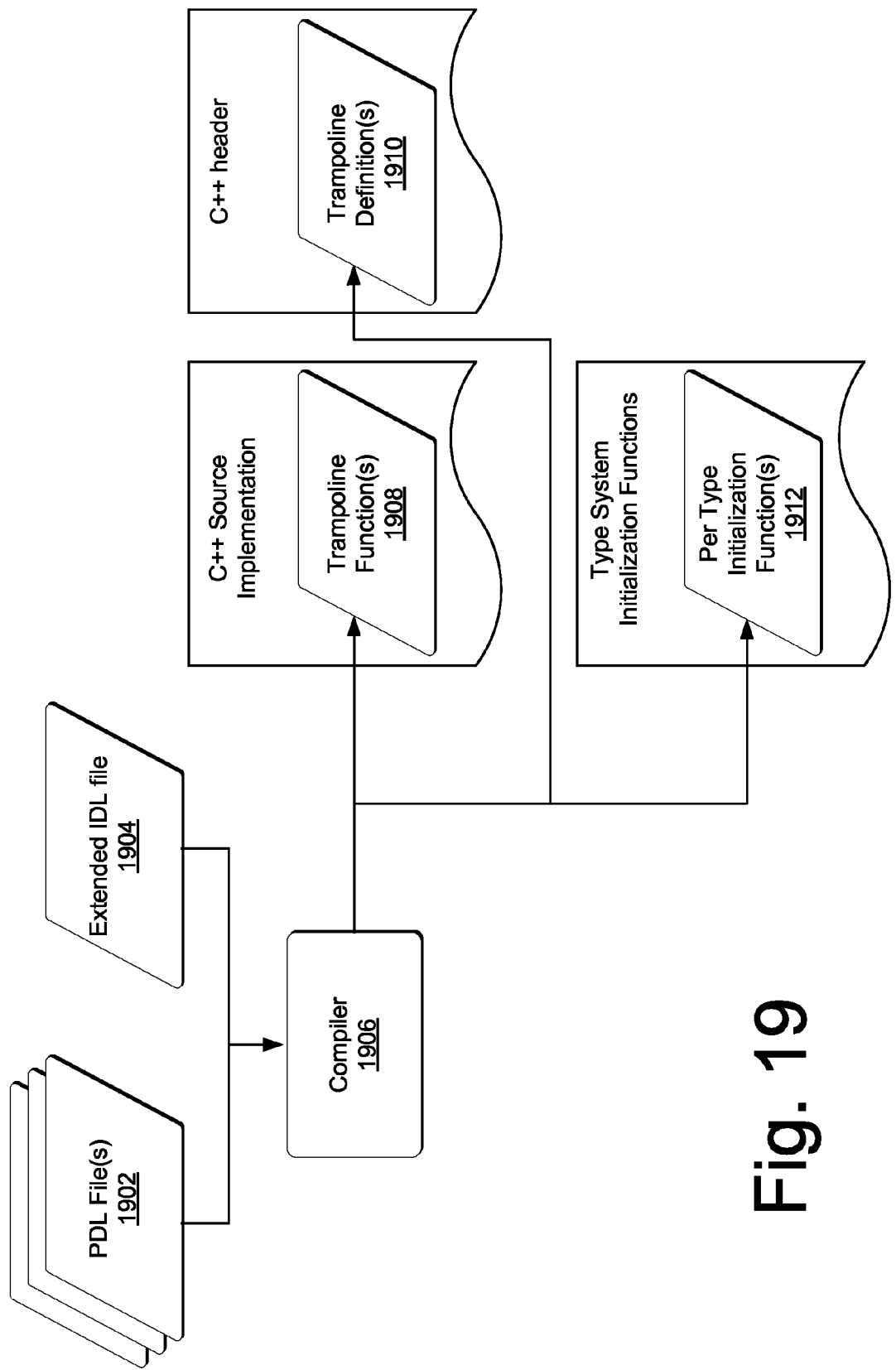
FIG. 19 illustrates a relationship diagram in accordance with one or more embodiments.

As an example, consider FIG. 19, which illustrates a relationship between extended IDL code, a compiler, and associated inputs and outputs. Here, Property Description Language (PDL) file(s) 1902 and extended IDL file 1904 are received and processed by a compiler 1906 to produce trampoline function(s) 1908, trampoline definition(s) 1910 and per type initialization function(s) 1912, all of which are described below in more detail.

In the illustrated and described embodiment, PDL files 1902 can include one or more files that define one or more layout engine programming objects and/or their associated APIs. Any suitable type of programming object can be defined through a PDL file, such as, by way of example and not limitation, a COM based object. In some embodiments, PDL files 1902 can include one or more files that define one or more scripting language objects, such as a dispatch object. Dispatch objects enable a scripting engine to lookup and/or obtain objects from a layout engine object through dynamic binding, such as through a dispatch method.

In one or more embodiments, extended IDL file 1904 includes alternate descriptions of at least some of the APIs and objects included in PDL files 1904. In some embodiments, an extended property description language and/or extended interface definition interface language is used to express these alternate descriptions. For example, the extended language can include additional attributes that can be applied to an API and/or object, as further described below. In addition to including attributes, extended IDL file 1904 can include hierarchical relationship information, such as a hierarchical arrangement of APIs. The APIs can be arranged as objects based upon the hierarchical information, thus reducing and/or eliminating redundancy that would be generated from using PDL file(s) 1902 without the extended IDL file 1904.

In the illustrated and described embodiment, compiler 1906 accepts multiple input files, such as PDL file(s) 1902 and extended IDL file 1904, and processes those files to produce trampoline function(s) 1908, trampoline definition(s) 1910, and per type initialization function(s) 1912. While illustrated as one module in FIG. 19, it is to be appreciated and understood that compiler 1906 can comprise multiple modules without departing from the spirit of the claimed subject matter.

In one or more embodiments, trampoline function 1908 includes code that enables calls between software modules to be bridged, such as dynamic type system direct functions as described above. In some embodiments, trampoline function 1908 can be generated as source code, such as C++ implementation files (.cpp files). Of course, other code types can be generated without departing from the spirit and scope of the claimed subject matter. Trampoline function 1908 can be partially or fully generated by compiler 1906.

In addition to trampoline function(s) 1908, compiler 1906 can generate trampoline definition(s) 1910. Trampoline definition(s) 1910 can include one or more definitions and/or forward declarations of associated trampoline function(s) 1908, such as forward declarations included in a header file (.h file).

In some embodiments, per type initialization functions 1912 include instructions and/or script written in a scripting language, such as JavaScript and enable initialization of one or more types in a type system, e.g., a dynamic type system deferred initialization as described above.

In addition to reducing and/or eliminating code redundancy, such as through object relationship information, the combined use of PDL file(s) 1902 and extended IDL file 1904 enable resultant code to be inspectable by a human prior to further compilation. For example, a developer can add, delete, and/or modify attributes within the extended IDL file 1904, input the modifications to compiler 1906, and inspect the resultant source code file(s) prior to generating binary code. This iterative process can enable software deficiencies to be located earlier in a development cycle.

Having discussed PDL and extended IDL files and how they can be processed by a compiler, consider now a discussion of an example extended IDL file in accordance with one or more embodiments.

Figure 20:
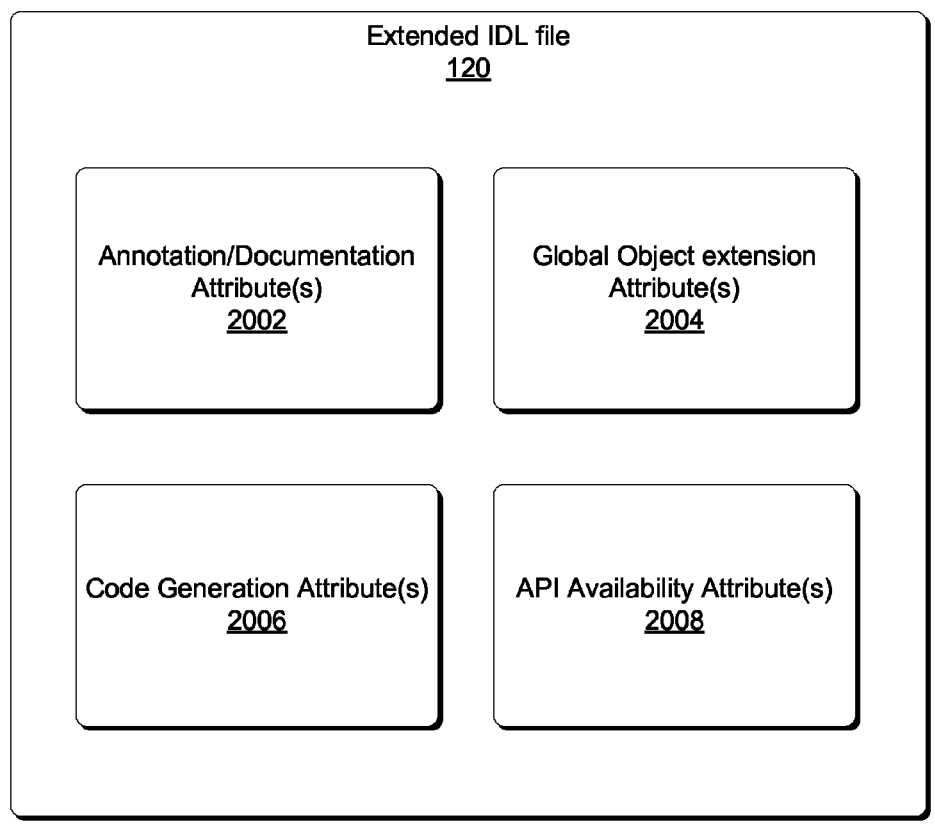
FIG. 20 illustrates an example extended IDL file in accordance with one or more embodiments.

FIG. 20 illustrates an expanded view of extensions that can be included in an extended IDL file, such as, for example, extended IDL file 120 of FIG. 1. While FIG. 20 illustrates extended IDL file 120 including a combination of features and/or attributes, it is to be appreciated and understood that any combination of attributes can be included and/or excluded without departing from the claimed subject matter.

In this particular example, extended IDL file 120 includes one or more annotation/documentation attributes 2002, one or more global object extension attributes 2004, one or more code generation attributes 2006, and/or one or more API availability attributes 2008, each of which is individually discussed below.

In one or more embodiments, the annotation/documentation attributes 2002 enable various forms of additional annotations and/or documentation to be included in extended IDL file 120 and/or associated output files. Some annotation attributes can be used for hyper-linking, such as by including a Uniform Resource Locator (URL). For instance, attributes can include links associated with an interface and/or property definitions, such as associated specifications and/or additional documentation on the interface and/or property definitions. Other annotation attributes can be used to describe, link, and/or point an interface and/or property definition to an associated binary code representation. In some embodiments, annotation attributes can be used to include release information, such as API introduction dates and/or times, modification date and/or times, author, revision number, and the like. Alternately or additionally, annotation attributes can include attributes that are used to extend a property with an associated attribute name and/or Cascading Style Sheet (CSS) property. For example, in some embodiments, an annotation attribute can be used to include an alternate language name of the property. Other annotation attributes can be used to include testing identification references, such as testing identification references that can be used to coordinate a public test suite of an associated API. In one or more embodiments, an annotation attribute can be used to include tag identifiers that enable API categorization and search-indexing.

In one or more embodiments, global object extension attribute 2004 enables control of which interface can be used to extend a scripting engine's global object. For example, global object extension attribute 2004 can identify one or more interface to be grafted as the global object. This can enable the existence of alternate forms of extended IDL file 120 to support different global object integration.

In one or more embodiments, code generation attribute 2006 enables control of how code is generated. For example, some attributes can be used to control security aspects of a property and/or API, such as marking a property and/or API as a Safe API as described above. Other attributes can be used to control default initialization of a property, such as configuring the property to be locked-down, un-mutable, not enumerable, and/or not configurable. Through the use of the attributes, properties can be configured independent from one another. For instance, a first property described in extended IDL file 120 can be configured to be mutable, while a second property in extended IDL file 120 can be configured to be un-mutable.

Alternately or additionally, attributes can be used to indicate entry points for associated code. For example, attributes can be used to describe C++ entry points. Other attributes can be used to indicate default values to be used for optional pass-in parameters.

In one or more embodiments, API availability attribute 2008 enables configuration of API availability based upon a current environment. For example, attributes can be used to enable one or more APIs to be available to a Web page running HyperText Markup Language (HTML), but be unavailable to a Web page running eXtensible Markup Language (XML). In some embodiments, an attribute can be used to mark an API as deprecated, which can trigger removal of the API under XML-based pages.

Figure 21:
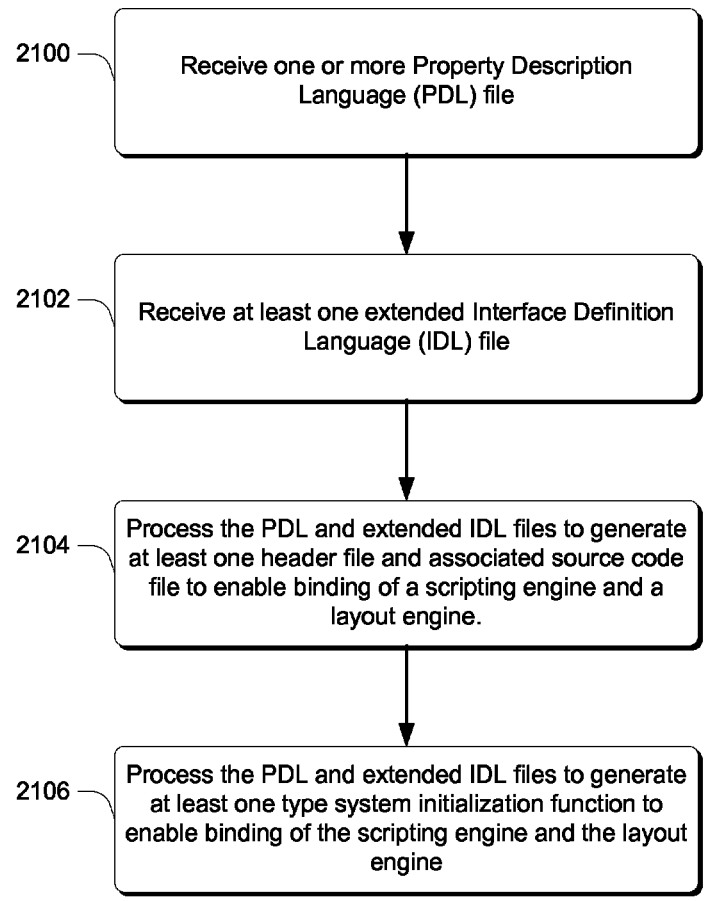
FIG. 21 is a flow diagram that describes steps in a method in accordance with one or more embodiments.

Having described various extensions that can be included in an IDL file, consider now FIG. 21, which illustrates a flow diagram that describes steps in a method in accordance with one or more embodiments. The method can be performed by any suitable hardware, software, firmware, or combination thereof. In at least some embodiments, aspects of the method are performed by software executing on a computing device.

Step 2100 receives one or more Property Description Language (PDL) files, examples of which are provided above. Step 2102 receives at least one extended Interface Definition Language (IDL) file. As described above, the extended IDL file can include any suitable combination of extended attributes, such as annotation attributes, global object extension attributes, and the like. Step 2104 processes the PDL and extended IDL files to generate at least one header file and associated source code file. The header file and associated source code file are configured to enable binding of a scripting engine and a layout engine, such as through direct type system direct functions. Step 2106 processes the PDL and extended IDL files to generate at least one type system initialization function. The type system initialization function can be configured to enable binding of the scripting engine and the layout engine, such as through dynamic type system deferred initialization as described above.

Having described of interface definition language integration, consider now a discussion of various aspects of other considerations in accordance with one or more embodiments.

Other Considerations

In accordance with one or more embodiments, other design consideration can be taken into account in designing a model to bind a layout engine with a scripting engine. Consider now the following discussion of a layout engine object and scripting language object integration model.

Layout Engine Object and Scripting Language Object Integration Model

In one or more embodiments, a dual nature object can be configured to be programmatically unified between its scripting engine side and its layout engine side. A scripting language object associated with the dual nature object can be extended from its default state to include additional properties and/or prototypes associated with a corresponding layout engine object, as well as properties and/or prototype inherited from other objects. In some embodiments, APIs of the layout engine object can be included in a lookup path of the scripting language object such that the APIs can be accessed in a manner native to the scripting language. In one or more embodiments, a prototype object associated with an API can be created and attached to the scripting language object. For example, APIs associated with a window object in the layout engine can be associated with a prototype object and attached to an associated scripting language object. Similarly, a web worker's global object can be extended by attaching a prototype containing APIs associated with a layout engine's web worker global object. In this way, the dual nature object can be integrated, thus enabling unified programming access.

In some embodiments, a proxy can be configured to forward requests to and from the scripting language object. For example, a window proxy can be configured to broker calls to the scripting language object when security allows access. At times, direct references to an object can be disallowed. For example, in a dual nature object, a direct reference to the underlying layout engine object can be forbidden. In these instances, the window proxy can be returned instead of the direct reference, thus enabling access to functionality without direct exposure of the object.

Having described an object integration model between a layout engine object and a scripting language object, consider now a discussion of backwards compatibility support that is in accordance with one or more embodiments.

Backwards Compatibility Support

In one or more embodiments, scripts running in the scripting engine can have access to layout engine objects via the dual nature object mentioned above. For instance, scripts can have access to a var object that is associated with the layout engine object in order to gain access and/or call APIs of the layout engine object. In some cases, an alternate path can be used to call the APIs. In approaches that utilize a COM based model, a COM based client can utilize methods, such as iUnknown and/or iDispatch, to directly acquire identification and/or invoke the APIs. Of course, other approaches can be utilized without departing from the spirit and scope of the claimed subject matter. In other cases, the COM based client can request more automated access, such as through iDispatchEx, as will be appreciated by the skilled artisan.

In COM based embodiments, when the COM based client calls iUnknown and/or iDispatch, the calls can be forwarded to the layout engine. The layout engine is configured to dynamically support these calls. The layout engine can create a tear-off object and/or interface to return to the COM based client. The tear-off object or interface enables dynamic binding for the requested functionality.

In one or more embodiments, when the COM based client calls iDispatchEx, the call can be forwarded around the scripting engine. In some embodiments, a backchannel can be created between the scripting engine and a scripting engine object. The backchannel can be configured to enable private transactions between the scripting engine and the scripting engine object. For example, through the backchannel, the scripting engine can natively access functionality of the scripting engine object while appearing to support the iDispatchEx in a more traditional manner.

Having described backwards compatibility support, consider now a discussion of support for multiple scripting engines in accordance with one or more embodiments.

Support for Multiple Scripting Engines

In some embodiments, a second scripting engine can be supported through an extension of a first scripting engine. In a dual nature system, the first scripting engine can be configured to look internally first for name resolution. If name resolution is not found in the first scripting engine lookup process, requests can be routed to the second scripting engine. The first scripting engine can be extended to support method invocations from the second scripting engine.

Having described other considerations, consider now a discussion of an example system in accordance with one or more embodiments.

Example System

Figure 22:
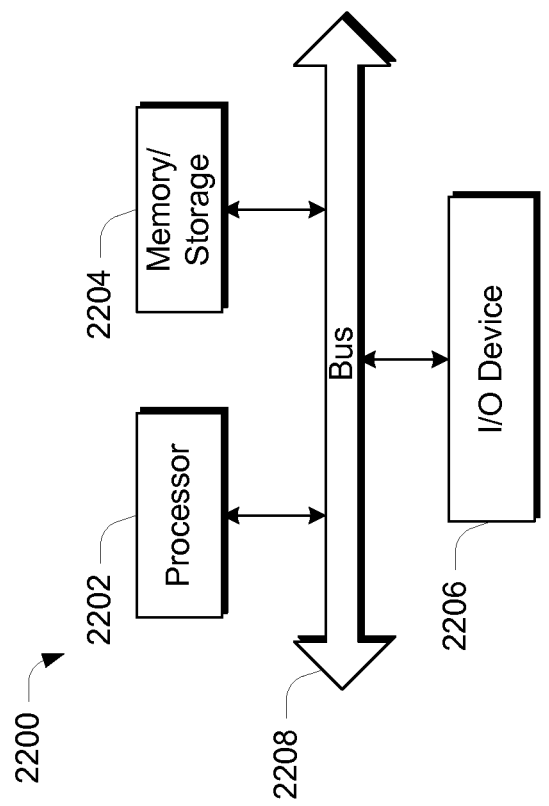
FIG. 22 illustrates an example system that can be utilized to implement one or more embodiments.

FIG. 22 illustrates an example computing device 2200 that can be used to implement the various embodiments described above. Computing device 2200 can be, for example, computing device 102 of FIG. 1 or any other suitable computing device.

Computing device 2200 includes one or more processors or processing units 2202, one or more memory and/or storage components 2204, one or more input/output (I/O) devices 2206, and a bus 2208 that allows the various components and devices to communicate with one another. Bus 2208 represents one or more of any of several types of bus structures, including a memory bus or memory controller, a peripheral bus, an accelerated graphics port, and a processor or local bus using any of a variety of bus architectures. Bus 2208 can include wired and/or wireless buses.

Memory/storage component 2204 represents one or more computer storage media. Component 2204 can include volatile media (such as random access memory (RAM)) and/or nonvolatile media (such as read only memory (ROM), Flash memory, optical disks, magnetic disks, and so forth). Component 2204 can include fixed media (e.g., RAM, ROM, a fixed hard drive, etc.) as well as removable media (e.g., a Flash memory drive, a removable hard drive, an optical disk, and so forth).

One or more input/output devices 2206 allow a user to enter commands and information to computing device 2200, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer-readable storage media".

"Computer-readable storage media" include volatile and non-volatile, removable and non-removable media implemented in any method or technology for storage of information such as computer readable instructions, data structures, program modules, or other data. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

CONCLUSION

Various embodiments provide an interface between a Web browser's layout engine and a scripting engine. The interface enables objects from the layout engine to be recognized by a memory manager in the scripting engine and interact in a streamlined, efficient manner. In accordance with one or more embodiments, the interface allows browser layout engine objects to be created as objects that are native to the scripting engine. Alternately or additionally, in some embodiments, the native objects are further configured to proxy functionality between the layout engine and the scripting engine.

In some embodiments, binding between the Web browser's layout engine and the scripting engine can include features configured to enable unified programming access between the layout engine and the scripting engine, as well as secured access across multiple domains. The features can be configured to enhance memory management, enable direct access between the layout engine and scripting engine, and/or enable mutability of a dual nature object.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method comprising:
exposing, in a scripting engine memory space, a base set of information associated with one or more types of a type system;
responsive to selection of the base set of information, initializing, in the scripting engine memory space, at least one link to at least one prototype implementation in the scripting engine memory space that is associated with at least one type of the one or more types;
initializing the at least one prototype implementation;
creating, in the scripting engine memory space, an object associated with the at least one type of the one or more types based, at least in part, on the at least one prototype; and
binding the object created in the scripting engine memory space to a backing object created in a layout engine memory space, the object in the scripting engine memory space being a representation of the backing object in the layout engine memory space.

2. The computer-implemented method of claim 1, wherein the base set of information associated with the one or more types of a type system comprises at least one constructor associated with the one or more types.

3. The computer-implemented method of claim 1, wherein the at least one link to at least one prototype implementation links to a parent prototype implementation.

4. The computer-implemented method of claim 1, wherein initializing the at least one prototype implementation further comprises:
creating at least one property in memory; and
initializing the at least one property to a default value.

5. The computer-implemented method of claim 1, wherein the object is created through an instance type operation.

6. A computer-implemented method comprising:
creating at least one layout engine object in a layout engine memory space;
creating at least one scripting language object in a scripting engine memory space, the at least one scripting language object bound to the at least one layout engine object via a linkage, wherein the linkage utilizes a custom object in the scripting engine memory space that is configured to include:
information associated with relationships between objects in the scripting engine memory space and the at least one scripting language object, including at least one hierarchical relationship between the at least one scripting language object and at least a second scripting language object, the at least one hierarchical relationship based, at least in part, on a hierarchical relationship associated with the at least one scripting layout engine object; and
information associated with the at least one layout engine object in the layout engine memory space; and
using at least one binding module to enable unified programming access between the at least one layout engine object and the at least one scripting language object.

7. The computer-implemented method of claim 6, wherein the at least one layout engine object comprises a document object.

8. The computer-implemented method of claim 6, wherein using the at least one binding module comprises enabling the at least one layout engine object to override capabilities associated with the at least one scripting language object.

9. The computer-implemented method of claim 6, wherein using the at least one binding module comprises enabling dynamic modifications of at least one Application Programming Interface (API) associated with the layout engine object.

10. The computer-implemented method of claim 6, wherein using the at least one binding module comprises enabling the at least one scripting language object to be transferred from a native scripting engine to a second scripting engine with at least some modified attributes preserved when transferred.

11. The computer-implemented method of claim 6, wherein using the at least one binding module comprises enabling calls to be bridged between the scripting language object and the layout engine object using native access associated with the scripting engine object.

12. A computing device comprising:
one or more processors;
one or more computer readable storage memories comprising computer readable instructions which, responsive to execution by the one or more processors, are configured to perform operations comprising:
  creating at least one layout engine object in a layout engine memory space;
  creating at least one scripting language object in a scripting engine memory space, the at least one scripting language object bound to the at least one layout engine object via a linkage, wherein the linkage utilizes a custom object in the scripting engine memory space that is configured to include:
    information associated with hierarchical relationships between the at least one scripting language object and one or more other objects in the scripting engine memory space, the hierarchical relationships between the at least one scripting language object and one or more other objects in the scripting engine memory space based, at least in part, on hierarchical relationships between the at least one layout engine object and one or more other objects in the layout engine memory space;
    information associated with sibling relationships between the at least one scripting language object and one or more other objects in the scripting engine memory space; and
    information associated with the at least one layout engine object in the layout engine memory space; and
  using at least one binding module to enable unified programming access between the at least one layout engine object and the at least one scripting language object.

13. The computing device of claim 12, wherein the at least one layout engine object comprises a document object.

14. The computing device of claim 12, wherein the computer readable instructions are further configured to enable the at least one layout engine object to override capabilities associated with the at least one scripting language object.

15. The computing device of claim 12, wherein the computer readable instructions are further configured to enable dynamic modifications of at least one Application Programming Interface (API) associated with the layout engine object.

16. The computing device of claim 12, wherein the computer readable instructions are further configured to enable the at least one scripting language object to be transferred from a native scripting engine to a second scripting engine with at least some modified attributes preserved when transferred.

17. The computing device of claim 12, wherein the computer readable instructions are further configured to enable calls to be bridged between the scripting language object and the layout engine object using native access associated with the scripting engine object.

18. The computing device of claim 12, wherein the computer readable instructions to enable calls to be bridged are further configured to perform caller validation.

19. The computing device of claim 12, wherein the binding module is configured to:
  initialize, using multiple stages, one or more types of a type system associated with the scripting engine; and
  enable a read-only property associated with the layout engine to be virtually replaceable through the scripting engine.

20. The computing device of claim 12, wherein the binding module is configured to:
  enable direct access, from the scripting engine, to one or more accessors associated with the layout engine without one or more parameters that are configured to distinguish between the one or more accessors; and
  enable prevention of code execution based upon an evaluation of code usage.

* * * * *